US012732993B2

(12) United States Patent
Kuo et al.

(10) Patent No.: US 12,732,993 B2
(45) Date of Patent: Sep. 8, 2026

(54) CONNECTED-MODE DISCONTINUOUS RECEPTION (C-DRX) TIMER VALUE SELECTION BASED ON LOGICAL CHANNEL (LCH) MAPPING

(71) Applicant: Apple Inc., Cupertino, CA (US)

(72) Inventors: Ping-Heng Kuo, London (GB); Weidong Yang, San Diego, CA (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 416 days.

(21) Appl. No.: 18/457,431

(22) Filed: Aug. 29, 2023

(65) Prior Publication Data

US 2024/0107524 A1 Mar. 28, 2024

Related U.S. Application Data

(60) Provisional application No. 63/376,926, filed on Sep. 23, 2022.

(51) Int. Cl.

*H04W 72/23* (2023.01)
*H04W 72/1268* (2023.01)
*H04W 72/232* (2023.01)
*H04W 76/28* (2018.01)

(52) U.S. Cl.

CPC ..... *H04W 72/1268* (2013.01); *H04W 72/232* (2023.01); *H04W 76/28* (2018.02)

(58) Field of Classification Search

CPC ........... H04W 72/232; H04W 72/1268; H04W 76/28; H04W 72/23

See application file for complete search history.

(56) References Cited

U.S. PATENT DOCUMENTS

2017/0318536 A1* 11/2017 Manepalli ............. H04W 24/02
2018/0368133 A1* 12/2018 Park ...................... H04L 5/0064
2019/0320491 A1* 10/2019 Shukair ................ H04B 17/327
2020/0029386 A1* 1/2020 Nam .................... H04B 7/0617
2020/0092073 A1* 3/2020 Papasakellariou .... H04L 5/0053

(Continued)

OTHER PUBLICATIONS

3rd Generation Partnership Project; Technical Specification Group Radio Access Network; NR; Medium Access Control (MAC) protocol specification; (Release 17); 3GPP TS 38.321 V17.1.0; Jun. 2022.

(Continued)

*Primary Examiner* — Andrew Lee

(74) *Attorney, Agent, or Firm* — Eschweiler & Potashnik, LLC

(57) ABSTRACT

A method and apparatus are provided for, in aspects, receiving, at a User Equipment (UE), a configuration relating to a logical channel (LCH) from a Base Station (BS); receiving, at the UE, an uplink grant for an uplink data; identifying a subset of the LCH mappable to the uplink grant based on the at least a part of the configuration; determining, at the UE, a connected-mode discontinuous reception (C-DRX) setting to be applied for an uplink transmission associated with the uplink grant based on the identified subset of the LCH; and controlling a quiescent state of the UE based on the C-DRX setting, wherein, in aspects, mappable may refer to allowed to be mapped or actually mapped. When LCHs of the subset are associated with different C-DRX settings, rule-based C-DRX selection can be used.

20 Claims, 11 Drawing Sheets

(56) References Cited

U.S. PATENT DOCUMENTS

| | | | | |
|---|---|---|---|---|
| 2020/0150736 | A1* | 5/2020 | Nam | G06F 1/3209 |
| 2020/0281022 | A1* | 9/2020 | Pelletier | H04W 72/0453 |
| 2021/0250989 | A1* | 8/2021 | Chin | H04W 76/27 |
| 2021/0314979 | A1* | 10/2021 | Agiwal | H04L 5/0032 |
| 2022/0174687 | A1* | 6/2022 | Kuo | H04W 72/535 |
| 2022/0264604 | A1* | 8/2022 | Fröberg Olsson | H04W 72/231 |

OTHER PUBLICATIONS

Apple Inc.; XR specific power saving techniques; 3GPP TSG RAN WG1 #110; R1-2207351; Aug. 22, 2022.

3rd Generation Partnership Project; Technical Specification Group Radio Access Network; NR; Radio Resource Control (RRC) protocol specification; (Release 17); 3GPP TS 38.331 V17.1.0; Jun. 2022.

* cited by examiner

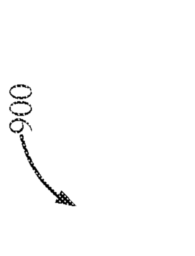

ALT 1: C-DRX TIMER VALUES SELECTED BASED ON LCHS ALLOWED TO BE MAPPED

1. RECEIVE AT LEAST ONE CONFIGURATION RELATING TO AT LEAST ONE LCH, A FIRST C-DRX SETTING, AND A SECOND C-DRX SETTING
2. SELECT FIRST C-DRX SETTING OR SECOND C-DRX SETTING BASED ON LCH ALLOWED TO BE MAPPED

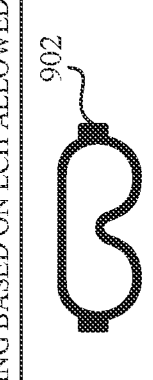

ALT: C-DRX TIMER VALUES SELECTED BASED ON LCHS MAPPED

1. RECEIVE AT LEAST ONE CONFIGURATION RELATING TO AT LEAST ONE LCH, A FIRST C-DRX SETTING, AND A SECOND C-DRX SETTING
2. SELECT FIRST C-DRX SETTING OR SECOND C-DRX SETTING BASED ON LCH MAPPED TO UPLINK GRANT

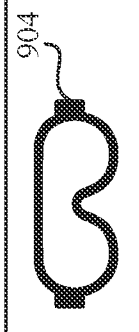

ALT: C-DRX TIMER VALUES SELECTED BASED ON PER-LCH C-DRX SETTING

1. DETERMINE C-DRX SETTING FOR EACH LCH BASED ON A CHARACTERISTIC OF TRAFFIC FLOW
2. SELECT C-DRX SETTING BASED ON A RULE

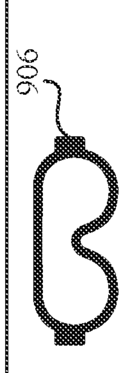

908

RAN 106

BASE STATION 112

910

912

914

124

CORE NETWORK

_LogicalChannelConfig_ information element

```
-- ASN1START
-- TAG-LOGICALCHANNELCONFIG-START

LogicalChannelConfig ::=           SEQUENCE {
    ul-SpecificParameters              SEQUENCE {
        priority                           INTEGER (1..16),
        prioritisedBitRate                 ENUMERATED {kBps0, kBps8, kBps16, kBps32, kBps64, kBps128, kBps256, kBps512,
                                           kBps1024, kBps2048, kBps4096, kBps8192, kBps16384, kBps32768, kBps65536, infinity},
        bucketSizeDuration                 ENUMERATED {ms5, ms10, ms20, ms50, ms100, ms150, ms300, ms500, ms1000,
                                                   spare7, spare6, spare5, spare4, spare3,spare2, spare1},
        cdrxSetting                        cdrxSettingId                                            OPTIONAL,   -- Need R

        allowedServingCells                SEQUENCE (SIZE (1..maxNrofServingCells-1)) OF ServCellIndex
                                                                                                OPTIONAL,   -- Cond PDCP-CADuplication
        allowedSCS-List                    SEQUENCE (SIZE (1..maxSCSs)) OF SubcarrierSpacing          OPTIONAL,   -- Need R
        maxPUSCH-Duration                  ENUMERATED {ms0p02, ms0p04, ms0p0625, ms0p125, ms0p25, ms0p5, ms0p01-v1700, spare1}
                                                                                                  OPTIONAL,   -- Need R
        configuredGrantType1Allowed        ENUMERATED {true}                                          OPTIONAL,   -- Need R
        logicalChannelGroup                INTEGER (0..maxLCG-ID)                                     OPTIONAL,   -- Need R
        schedulingRequestID                SchedulingRequestId                                        OPTIONAL,   -- Need R
        logicalChannelSR-Mask              BOOLEAN,
        logicalChannelSR-DelayTimerApplied BOOLEAN,
        ...,
        bitRateQueryProhibitTimer      ENUMERATED {s0, s0dot4, s0dot8, s1dot6, s3, s6, s12, s30}       OPTIONAL,   -- Need R
        [[
        allowedCG-List-r16                 SEQUENCE (SIZE (0.. maxNrofConfiguredGrantConfigMAC-1-r16)) OF ConfiguredGrantConfigIndexMAC-r16
                                                                                                  OPTIONAL,   -- Need S
        allowedPHY-PriorityIndex-r16       ENUMERATED {p0, p1}                                        OPTIONAL    -- Need S
        ]],
        [[
        logicalChannelGroup-IAB-Ext-r17    INTEGER (0..maxLCG-ID-IAB-r17)                             OPTIONAL,   -- Need R
        allowedHARQ-mode                   ENUMERATED {harqModeA, harqModeB}                          OPTIONAL    -- Need S
        ]]
    }                                                                                           OPTIONAL,   -- Cond UL
    ...,
    [[
    channelAccessPriority-r16          INTEGER (1..4)                                           OPTIONAL,   -- Need R
    bitRateMultiplier-r16              ENUMERATED {x40, x70, x100, x200}                        OPTIONAL    -- Need R
    ]]
}

-- TAG-LOGICALCHANNELCONFIG-STOP
-- ASN1STOP
```

| ***cdrxSetting*** |
| --- |
| Indicates the C-DRX setting ID associating to this logical channel. |

*FIG. 12*

CONNECTED-MODE DISCONTINUOUS RECEPTION (C-DRX) TIMER VALUE SELECTION BASED ON LOGICAL CHANNEL (LCH) MAPPING

REFERENCE TO RELATED APPLICATIONS

This application claims the benefit of U.S. Provisional Patent Application 63/376,926 filed Sep. 23, 2022, entitled "CONNECTED-MODE DISCONTINUOUS RECEPTION (C-DRX) TIMER VALUE SELECTION BASED ON LOGICAL CHANNEL (LCH) MAPPING", the contents of which are herein incorporated by reference in their entirety.

FIELD

The present disclosure relates to wireless technology including New Radio (NR) discontinuous reception (DRX) including a system and method for selection of a connected-mode discontinuous reception (C-DRX) related timer value among a plurality of possible C-DRX related timer values.

BACKGROUND

Mobile communication in a next generation wireless communication system, a Fifth Generation (5G) NR network, will provide ubiquitous connectivity and access to information, as well as the ability to share data, around the globe. 5G networks will be a unified, service-based framework, that will target to meet versatile, and sometimes conflicting, performance criteria. 5G networks will provide services to vastly heterogeneous application domains ranging from Enhanced Mobile Broadband (eMBB) to massive Machine-Type Communications (mMTC), Ultra-Reliable Low-Latency Communications (URLLC), and other communications. In general, 5G NR will evolve based on Third Generation Partnership Project (3GPP) long term evolution (LTE)-Advanced technology with additional enhanced radio access technologies (RATs) to enable seamless and faster wireless connectivity solutions. Moreover, the development of enhanced power saving technology is beneficial to implementation of wireless communication.

BRIEF DESCRIPTION OF THE DRAWINGS

FIG. 9 is a block diagram illustrating a wireless communication system comprising a CN, a RAN, and a plurality of UEs configured to provide solutions for selection among a plurality of possible C-DRX related timer values in accordance with at least one aspect.

FIG. 12 is an example of a radio resource control (RRC) reconfiguration message for LCH configuration in accordance with some aspects.

DETAILED DESCRIPTION

Figure 1:
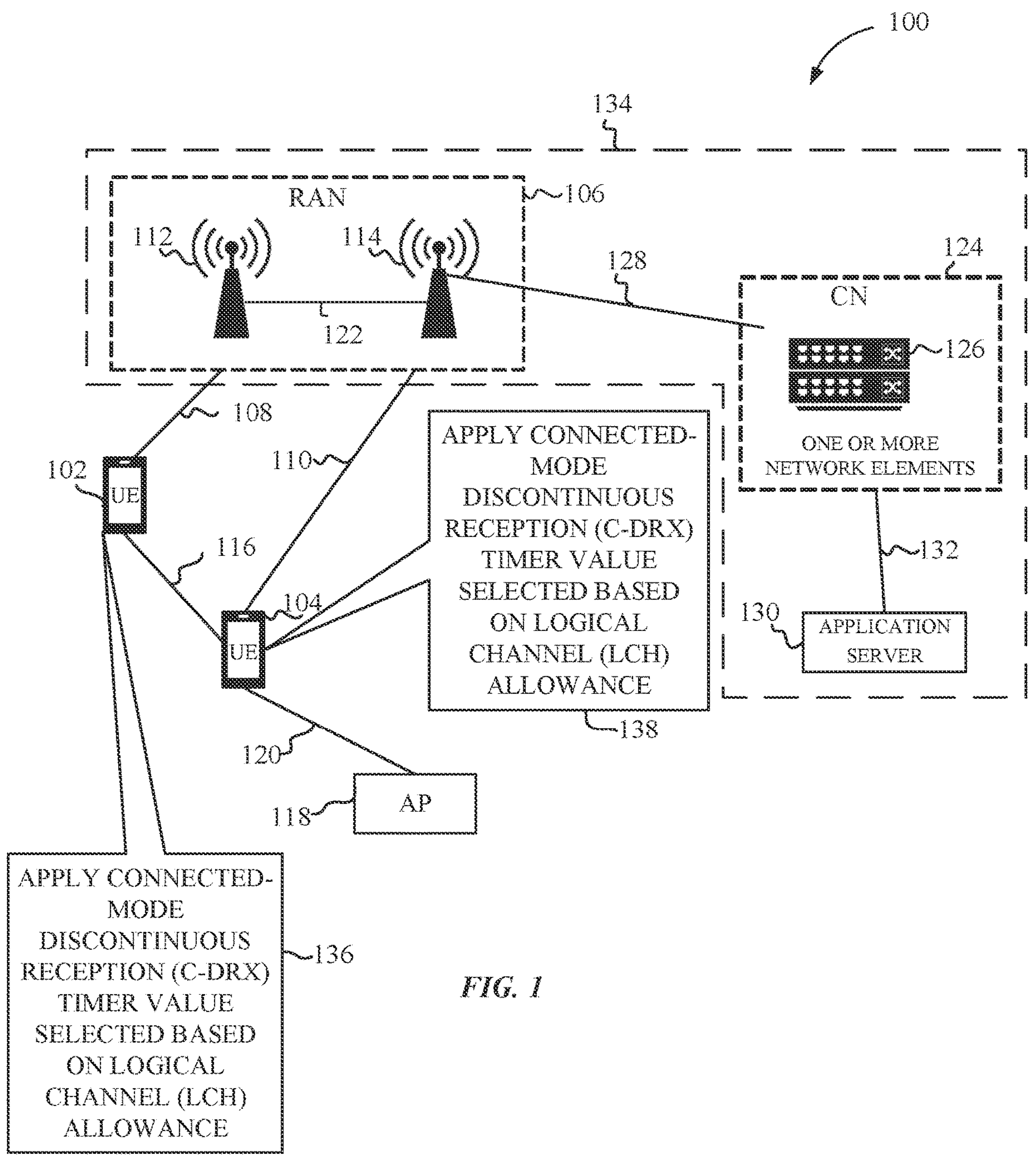
FIG. 1 is a block diagram illustrating exemplary wireless communication system 100 of a network that includes user equipments (UEs), a radio access network (RAN), and a core network (CN) in accordance with various aspects described herein.

Wireless communication devices with increasing processing capability can be implemented in small, lightweight enclosures and can be powered using an electrochemical cell or battery. As extended operational times are desirable, techniques for reducing power consumption are useful. Such techniques can be implemented in UE, and some such techniques can be implemented in a RAN (e.g., in a BS).

A UE can switch from a network access mode to a power efficient mode (e.g., a quiescent mode, such as a sleep mode) when there is no traffic to be communicated. One situation where a UE can save power is to return to the power efficient mode after the UE has transmitted information to the BS but before the BS has had sufficient time to process the information and initiate a subsequent transmission to the UE.

Since a large amount of the power consumption of a UE for NR or LTE occurs when the UE is in the access mode, it is important to reduce power consumption during the network access in RRC_CONNECTED mode, which includes the processing of aggregated bandwidth, active RF chain number and active reception/transmission time, and dynamic transition to power efficient mode. Specifically, methods to enhance transitions between network access mode and power saving mode can be studied. Moreover, ensuring reliable reception at a UE by properly timing C-DRX implementation can also reduce power consumption. This is due to the fact that any erroneous reception event because of improper C-DRX implementation would have negative impact on UE power consumption and/or other communication performance metrics such as communication latency.

To enhance reception reliability as well as the overall efficiency of C-DRX implementation, in various aspects, one or more techniques discussed herein can be employed to support selection of a DRX (e.g., C-DRX) timer setting to coordinate entry of a UE's receive circuitry into a quiescent mode for a duration over which a BS is not expected to transmit a signal destined for the UE. In accordance with various aspects, a DRX timer setting can be selected based on whether any LCH in a list of LCHs is allowed to be mapped to an uplink grant, whether any LCH in a list of LCHs is mapped to an uplink grant (collectively, whether any LCH in a list of LCHs is mappable to an uplink grant), or based on applying a ranking rule for DRX timer setting selection.

Whether a LCH can be mapped to an uplink grant is based on LCH mapping restriction configured for this LCH. For example, a medium access control (MAC) entity may check if a LCH can be multiplexed into a MAC protocol data unit (PDU) for a grant by evaluating whether the uplink grant meets the RRC-configured LCH mapping restriction criteria. The LCH mapping restriction criteria may include: the allowed Subcarrier Spacing(s) for transmission, the maximum PUSCH duration allowed for transmission, whether a configured grant Type 1 can be used for transmission, the allowed cell(s) for transmission, the allowed configured grant(s) for transmission, the allowed PHY priority index(es) of a dynamic grant for transmission, or the allowed HARQ mode for transmission. If a LCH has not been configured with any mapping restriction, then it is allowed to be mapped to any uplink grant.

Additional aspects and details of the disclosure are further described below with reference to figures.

FIG. 1 illustrates a wireless communication system 100 including UE 102 and UE 104, a radio access network (RAN) 106, and a core network (CN) 124 in accordance with various aspects described herein. The RAN 106 includes one or more base stations 112,114 connected via interface 122. The CN 124 includes one or more network elements 126 which are configured to offer various data and telecommunication services to customers/subscribers (e.g., a user of UE 102 or a user of UE 104) who are connected to the CN 124 via the RAN 106. The RAN 106 can be connected with the CN 124 via an NG interface 128. Application server 130 can be configured to support one or more communication services (e.g., VoIP sessions, push-to-talk (PTT) sessions, group communication sessions, social networking services, etc.) for UE 102 or UE 104 of CN 124 (e.g., via an evolved packet core (EPC) of CN 124 or a 5GC of CN 124). As an example, application server 130 may communicate with CN 124 through an IP communications interface 132. UE 102 and UE 104 are configured for operation in C-DRX mode.

In some aspects, UE 102 can apply a connected-mode discontinuous reception (C-DRX) timer value selected based on logical channel (LCH) allowance, as shown by notation 136. In accordance with at least one aspect, UE 104 can apply a connected-mode discontinuous reception (C-DRX) timer value selected based on logical channel (LCH) allowance, as shown by notation 138. Examples detailing such operation of UE 102 or UE 104, or operation of a base station, such as base station 112 or base station 114, to effect C-DRX related timer value selection based on LCH allowance, and at least one method for effecting C-DRX related timer value selection based on LCH allowance are disclosed herein.

UE 102 or UE 104 may be a handheld touchscreen mobile computing device connectable to one or more cellular networks (e.g., a smartphone). As another example, UE 102 or 104 may be an extended reality (XR) computing device (e.g., a virtual reality (VR), mixed reality (MR), or augmented reality (AR) computing device). As another example, UE 102 or UE 104 may comprise any mobile or non-mobile computing device configured for wireless communication. UE 102 or UE 104 can communicate with the CN 124 by way of the RAN 106. In aspects, the RAN 106 can be a next generation (NG) RAN (NG-RAN or 5G RAN), an Evolved Universal Mobile Telecommunications System (UTMS) Terrestrial RAN (E-UTRAN), or a legacy RAN, such as a UTMS terrestrial radio access network (UTRAN) or global system for mobile communications (GSM) enhanced data rates for GSM evolution (EDGE) radio access network (GERAN). As used herein, the term "NG-RAN" or the like can refer to a RAN 106 that operates in an NR or 5G system, as may be implemented with respect to wireless communication system 100, and the term "E-UTRAN" or the like can refer to a RAN 106 that operates in an LTE or 4G system, as may be implemented with respect to wireless communication system 100. UE 102 and UE 104 utilize connections (or channels) (shown as connection 108 and connection 110, respectively) with RAN 106, each of which comprises a physical communications interface. RAN 106 can include one or more base stations, such as base station 112 and base station 114, that enable connection 108 and connection 110. In this example, the connection 108 and connection 110 are air interfaces to enable such communicative coupling, and may be consistent with radio access technology or technologies (RAT or RATs) used by the RAN 106, such as, for example, an LTE and/or NR.

The RAN 106 can include one or more access nodes (e.g., base station 112 or base station 114) that enable the connections 108 and 110. As used herein, the terms "access node," "access point," or the like can describe equipment that provides the radio baseband functions for data and/or voice connectivity between a network and one or more users. These access nodes can be referred to as a base station (BS), a next generation base station (gNB), a RAN node, an evolved next generation base station (eNB), a NodeB, a road side unit (RSU), a transmission reception point (TRxP or TRP), and so forth.

The RAN 106 is shown to be communicatively coupled to a core network—in this aspect, CN 124. The CN 124 can comprise one or more network elements 126, which are configured to offer various data and telecommunication services to customers/subscribers (e.g., a user of UE 102 or a user of UE 104) who are connected to the CN 124 via the RAN 106.

In some aspects, all or parts of the base station 112 or base station 114 may be implemented using one or more software entities running on server computers as part of a virtual network. In addition, or in other aspects, the base station 112 or base station 114 may be configured to communicate with one another via interface 122.

Figure 2:
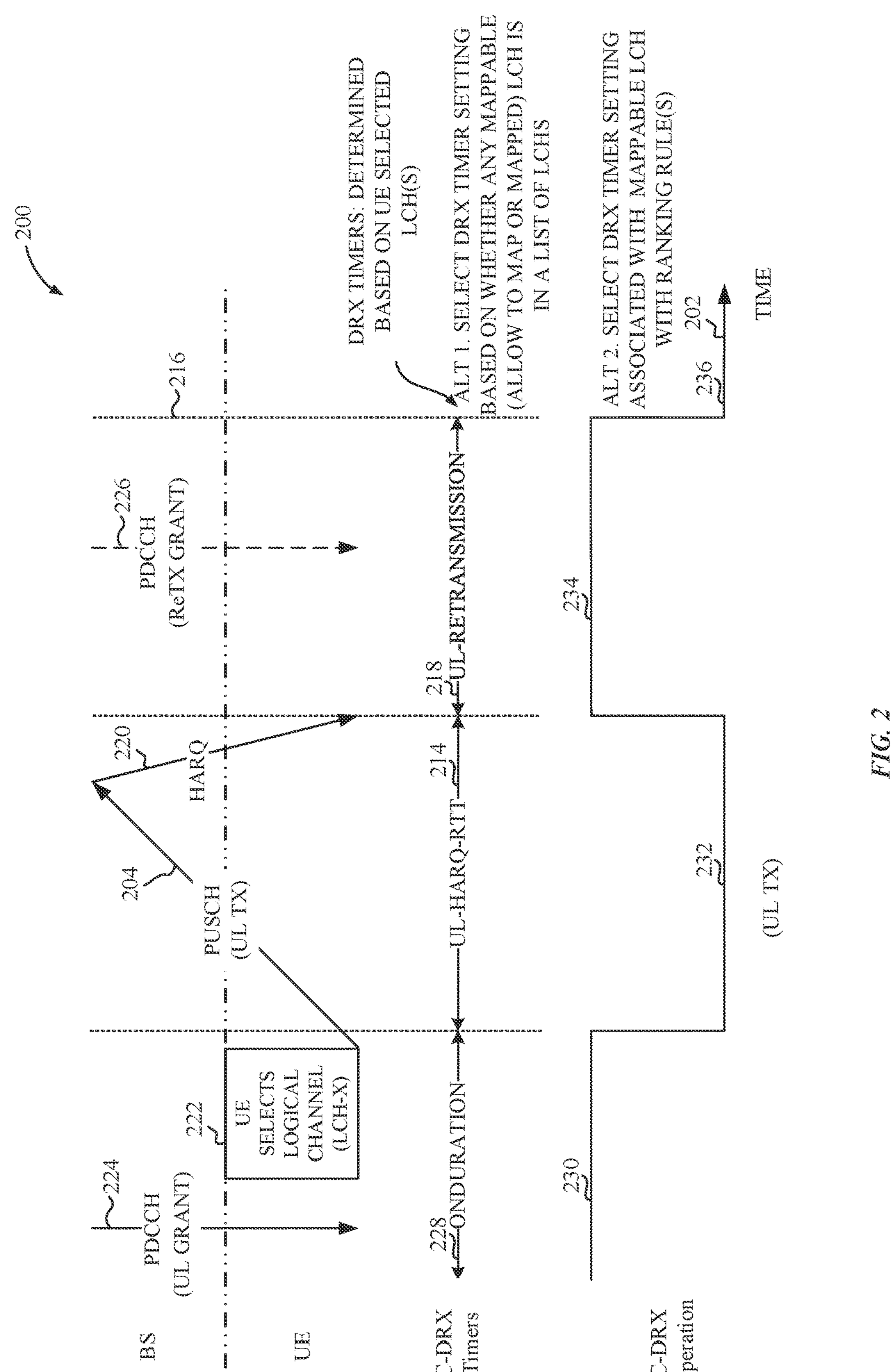
FIG. 2 is a timing diagram illustrating temporal relationships of events in accordance with various aspects described herein.

FIG. 2 is a timing diagram illustrating temporal relationships of events in accordance with various aspects described herein. In some aspects, multiple C-DRX timers are used to coordinate operation of the UE during C-DRX operation. For example, an ON-duration Timer can be used to define a time period 228 during which the UE should be active to receive an uplink allocation for a PUSCH transmission of uplink data 204, as shown by active level 230 of waveform 202. Uplink grant 224 can be transmitted on PDCCH to communicate the allocation of uplink resources. In response to the uplink allocation provided by uplink grant 224, the UE selects a LCH for transmitting the uplink data 204 on the PUSCH, which is shown as event 222. Whether a LCH can be mapped to an uplink grant is based on LCH mapping restriction configured for this LCH. For example, a medium access control (MAC) entity of the UE may check whether an LCH can be multiplexed into the MAC protocol data unit (PDU) for the uplink grant by evaluating whether the uplink grant meets some RRC-configured LCH mapping restriction criteria.

Example LCH mapping restriction criteria include, for example, allowedSCS-List, which sets the allowed Subcarrier Spacing(s) for transmission; maxPUSCH-Duration, which sets the maximum PUSCH duration allowed for transmission; configuredGrantType1Allowed, which sets whether a configured grant Type 1 can be used for transmission; allowedServingCells, which sets the allowed cell(s) for transmission; allowedCG-List, which sets the allowed configured grant(s) for transmission; allowedPHY-Priority-Index, which sets the allowed PHY priority index(es) of a dynamic grant for transmission; and allowedHARQ-mode, which sets the allowed HARQ mode for transmission. If an LCH has not been configured with any mapping restriction, then it is allowed to be mapped to any uplink grant.

Then, with the transmission of uplink data 204, the UE starts a DRX hybrid automatic repeat request round trip time (HARQ-RTT) timer, referred to as drx-HARQ-RTT-TimerUL for example. A duration 214 of time is set by the DRX HARQ-RTT timer value to allow the BS, such as a gNodeB (gNB), to process the PUSCH and send HARQ 220 back to the UE, and hence the UE does not expect any retransmission grant to be received prior to expiration of the DRX HARQ-RTT timer. Therefore, the UE need not monitor a physical downlink control channel (PDCCH) while the round trip time (RTT) timer is running, allowing the UE to save power, as shown by inactive level 232 of waveform 202.

After the RTT timer is expired, the UE starts a Retransmission Timer, referred to as drx-RetransmissionTimerUL for example. The UE may potentially receive a communication via PDCCH for a retransmission grant 226 after the BS processes the PUSCH, so the UE remains active and able to receive and monitors the PDCCH over a time duration 218 when the Retransmission Timer is running, as shown by active level 234 of waveform 202. Further power saving can be achieved by changing the UE to a quiescent mode after the Retransmission Timer is expired, as shown by inactive level 236 of waveform 202. Alternatively, if a subsequent transmission from the BS is expected to be received at the UE, the UE may remain in an active mode.

Thus, as stated above, an uplink grant 224 via PDCCH can be received from a BS at a UE during an On-Duration for PUSCH allocation when a drx-onDurationTimer is running. The UE starts the DRX HARQ-RTT timer with an uplink transmission of uplink data 204 via PUSCH, and the UE need not monitor the PDCCH while drx-HARQ-RTT-TimerUL is running. At expiration of the drx-HARQ-RTT-TimerUL, the UE starts the retransmission timer drx-RetransmissionTimerUL. While the retransmission timer is running, the UE monitors the PDCCH for potential retransmission grant 226.

As noted above, a LCH mapping restriction can prevent the mapping of a LCH to an uplink grant. When no such LCH mapping restriction is applied, a LCH is allowed to be mapped to an uplink grant. The allowance of a LCH to be mapped to an uplink grant can be referred to as a LCH mapping allowance. In accordance with at least one aspect disclosed herein, a C-DRX related timer value can be selected based on LCH mapping allowance to a physical uplink shared channel (PUSCH). As an example, C-DRX operations for uplink communication from a UE to a BS can be performed according to C-DRX related timer values selected based on LCH mapping allowance. A UE may be configured to choose one or more C-DRX related timer values related to a PUSCH transmission based on a LCH configuration received by the UE from the BS. As an example, the UE may be configured to choose a C-DRX related timer value based on which LCHs are allowed to be mapped to the uplink grant or which LCHs are actually mapped to the uplink grant. A subset of LCHs which are allowed to be mapped to the uplink grant and also LCHs which are mapped to the uplink grant can be referred to as the subset of LCHs which are mappable to the uplink grant. Thus, an LCH which is mappable to the uplink grant can be either a LCH which is allowed to be mapped to the uplink grant or a LCH which is mapped to the uplink grant.

According to an example of a first solution, C-DRX related timer value selection is performed based on an LCH being allowed to be mapped to an uplink grant. A BS (e.g., gNB) may pre-configure a UE to adaptively choose a C-DRX timer (e.g., drx-HARQ-RTTTimer-UL or drx-RetransmissionTimer-UL) value associated with a PUSCH transmission. The timer value may be selected based on which LCHs are allowed to be mapped to the uplink grant of this PUSCH. For example, if a pre-determined specific LCH (e.g., an Xth LCH, LCH-X) is allowed on a PUSCH, a C-DRX retransmission timer can be configured with a first time value. If the pre-determined specific LCH (e.g., LCH-X) is not allowed on the PUSCH, the C-DRX retransmission timer can be configured with a second time value. The second time value may be greater than the first time value to increase the time for the UE to receive a retransmission grant.

In some aspects, the MAC entity is further configured with a list of LCHs. If at least one of the LCHs in the list is allowed to be mapped to an uplink grant, the UE uses a first C-DRX setting (a first set of C-DRX related timer values) for the PUSCH associated with the uplink grant. If none of the LCHs in the list is allowed to be mapped to an uplink grant, the UE uses a second C-DRX setting (a second set of C-DRX related timer values) for the PUSCH associated with the uplink grant. As a BS (e.g., gNB) has information as to whether LCHs are allowed to be mapped to an uplink grant (e.g., based LCH mapping restrictions it has configured), the BS has information as to what C-DRX setting the UE would choose, so there is no misalignment issue of a difference in information available to the BS and the UE.

Accordingly, in one aspect, a UE receives from a BS configurations of mapping restrictions for at least one LCH, a list of LCHs with C-DRX adaptation considerations, a first C-DRX setting, and a second C-DRX setting. The UE receives from the BS an uplink grant. The UE then determines if any LCH in the list of LCHs with C-DRX adaptation considerations is allowed to be mapped to the uplink grant. If so, the UE uses the first C-DRX setting for the C-DRX operation associated with the PUSCH of the uplink grant. If not, the UE uses the second C-DRX setting for the C-DRX operation associated with the PUSCH of the uplink grant.

According to an example of a second solution, C-DRX related timer value selection is based on an actual LCH mapping. A BS (e.g., gNB) may pre-configure a UE to adaptively choose a C-DRX related timer value associated with a PUSCH transmission. As examples, the timer can be either drx-HARQ-RTTTimer-UL, or drx-Retransmission-Timer-UL. The timer value may be selected based on which LCHs are actually mapped onto the uplink grant of this PUSCH. For example, if an Xth LCH (LCH-X) is mapped on a PUSCH, a C-DRX timer, such as drx-Retransmission-TimerUL, can be configured to use a first C-DRX timer setting with a first C-DRX related timer value. If the LCH-X is not mapped on the PUSCH, the C-DRX timer (e.g., drx-RetransmissionTimerUL) can be configured to use a second C-DRX timer setting with a second C-DRX related timer value longer than the first C-DRX related timer value of the first C-DRX timer setting. Optionally, a different C-DRX timer (e.g., drx-HARQ-RTT-TimerUL) can have the same or different values between the two cases. For example, the drx-HARQ-RTT-TimerUL timer may have a shorter or longer duration for a LCH-X mapped onto an uplink grant of a PUSCH than for a LCH-X not allowed to be mapped onto an uplink grant of a PUSCH.

In accordance with at least one aspect, a MAC entity is further configured with a list of LCHs. If at least one of the LCHs in the list is mapped to an uplink grant (i.e., at least one of the LCHs in the list has data available and will be included in the MAC PDU), the UE uses a first set of C-DRX related timer values for the PUSCH associated with this uplink grant. If none of the LCHs in the list is mapped to an uplink grant (i.e., none of the LCHs in the list will be included in the MAC PDU), the UE uses a second set of C-DRX related timer values for the PUSCH associated with this uplink grant. It is worth noting that, there may be some misalignment issue as the BS does not necessarily possess information as to which LCHs are actually mapped to this uplink grant before decoding it. Thus, the BS may not have information to determine which C-DRX setting the UE has selected for this PUSCH. To inform BS the selected C-DRX setting, the UE may signal to the BS by transmitting an uplink control information (UCI). In one aspect, the UCI may be multiplexed into the PUSCH, indicating which C-DRX setting will be chosen. Alternatively, the UCI for such indication could be sent in a separate physical uplink control channel (PUCCH). Another solution is for the BS to rely on buffer status reporting (BSR) information it has received from the UE before issuing the uplink grant (which can be referred to as previously received BSR information). For example, the BS evaluates which C-DRX setting the UE would choose based the data availability of LCHs or logical channel groups (LCGs) indicated in the BSR received earlier. If at least one of the LCHs in the list of LCHs with C-DRX adaptation considerations is shown to have some data in the BSR, the BS would presume the first set of C-DRX related timer values will be chosen. As yet another solution, the BS can rely on a scheduling request (SR) it has received before issuing the uplink grant. Depending on which LCH triggers this SR (which can be termed a triggering LCH), the BS determines which C-DRX setting would be chosen by the UE.

Accordingly, for at least one aspect, a UE receives from the BS configurations of mapping restrictions for at least one LCH, a list of LCHs with C-DRX adaptation considerations, a first C-DRX setting, and a second C-DRX setting. The UE receives from the BS an uplink grant. The UE then performs logical channel prioritization (LCP) to construct a MAC PDU for the uplink grant. The UE determines if any LCH in the list of LCHs with C-DRX adaptation considerations is mapped to the uplink grant. If so, the UE uses the first C-DRX setting for the C-DRX operation associated with the PUSCH of the uplink grant. If none of the LCHs in the list of LCHs is mapped to the uplink grant, the UE uses the second C-DRX setting for the C-DRX operation associated with the PUSCH of the uplink grant. The UE can transmit a UCI to the BS indicating C-DRX adaptation in the PUSCH.

According to an example of a third solution, per-LCH DRX setting association is implemented. Each LCH may be configured to associate with a C-DRX setting. Such configuration may be implemented in the information elements (IE) of logicalChannelConfig. If the configuration is absent, the LCH is associated with the default C-DRX setting. Depending on which LCH or LCHs are allowed to be mapped, or are actually mapped, to an uplink grant, the UE chooses the C-DRX setting to be applied for the PUSCH of the uplink grant. The BS may determine the C-DRX setting for an LCH based on one or more characteristics of the traffic flow corresponding to the LCH or data radio bearer (DRB), for example: delay budget, jitter characteristic, periodicity, packet size, or the like.

When multiple LCHs are allowed or are actually mapped to an uplink grant, and the LCHs mapped to the uplink grant are associated with different C-DRX settings, the UE may select a C-DRX setting from the different C-DRX settings for the corresponding PUSCH.

In accordance with at least one aspect, among the LCHs that are allowed or are actually mapped to the uplink grant, the UE selects the C-DRX setting for the PUSCH based on one (or a combination of more than one) of the following rules: select the C-DRX setting associated with the LCH with the highest priority; select the C-DRX setting associated with the LCH with the lowest priority; select the C-DRX setting with the highest DRX HARQ RTT Timer value; select the C-DRX setting with the lowest DRX HARQ RTT Timer value; select the C-DRX setting with the highest DRX Retransmission Timer value; and select the C-DRX setting with the lowest DRX Retransmission Timer value.

Figure 3:
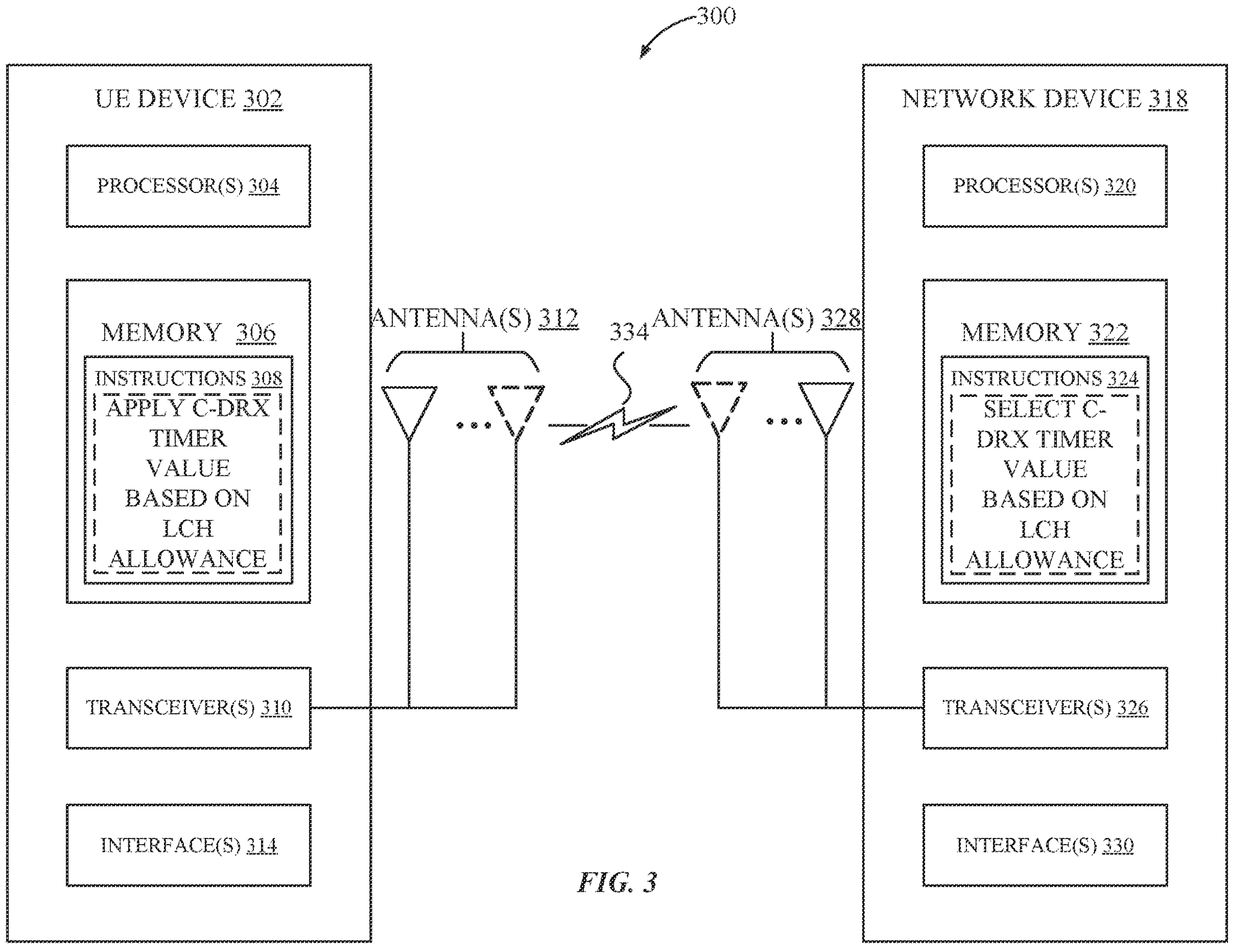
FIG. 3 illustrates a system for performing signaling between a wireless device and a network device in accordance with at least one aspect disclosed herein.

FIG. 3 illustrates a system 300 for performing signaling 334 between a wireless device 302 and a network device 318 in accordance with at least one aspect disclosed herein. The system 300 may be a portion of a wireless communications system as herein described. The wireless device 302 may be, for example, a UE of a wireless communication system. The network device 318 may be, for example, a base station (e.g., an eNB or a gNB) of a wireless communication system.

The wireless device 302 may include one or more processor(s) 304. The processor(s) 304 may execute instructions such that various operations of the wireless device 302 are performed, as described herein. The processor(s) 304 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 302 may include a memory 306. The memory 306 may be a non-transitory computer-readable storage medium that stores instructions 308 (which may include, for example, the instructions being executed by the processor(s) 304). The instructions 308 may also be referred to as program code or a computer program. The memory 306 may also store data used by, and results computed by, the processor(s) 304.

The wireless device 302 may include one or more transceiver(s) 310 that may include radio frequency (RF) transmitter and/or receiver circuitry that use the antenna(s) 312 of the wireless device 302 to facilitate signaling (e.g., the signaling 334) to and/or from the wireless device 302 with other devices (e.g., the network device 318) according to corresponding RATs.

The wireless device 302 may include one or more antenna(s) 312 (e.g., one, two, four, or more). For aspects with multiple antenna(s) 312, the wireless device 302 may leverage the spatial diversity of such multiple antenna(s) 312 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 302 may be accomplished according to precoding (or digital beamforming) that is applied at the wireless device 302 that multiplexes the data streams across the antenna(s) 312 according to known or assumed channel characteristics such that each data stream is received with an appropriate signal strength relative to other streams and at a desired location in the spatial domain (e.g., the location of a receiver associated with that data stream). Certain aspects may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain aspects having multiple antennas, the wireless device 302 may implement analog beamforming techniques, whereby phases of the signals sent by the antenna(s) 312 are relatively adjusted such that the (joint) transmission of the antenna(s) 312 can be directed (this is sometimes referred to as beam steering).

The wireless device 302 may include one or more interface(s) 314. The interface(s) 314 may be used to provide input to or output from the wireless device 302. For example, a wireless device 302 that is a UE may include interface(s) 314 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 310/antenna(s) 312 already described) that allow for communication between the UE and other devices and may operate according to known protocols (e.g., Wi-Fi®, Bluetooth®, and the like).

The network device 318 may include one or more processor(s) 320. The processor(s) 320 may execute instructions such that various operations of the network device 318 are performed, as described herein. The processor(s) 304 may include one or more baseband processors implemented using, for example, a CPU, a DSP, an ASIC, a controller, an FPGA device, another hardware device, a firmware device, or any combination thereof configured to perform the operations described herein.

The network device 318 may include a memory 322. The memory 322 may be a non-transitory computer-readable storage medium that stores instructions 324 (which may include, for example, the instructions being executed by the processor(s) 320). The instructions 324 may also be referred to as program code or a computer program. The memory 322 may also store data used by, and results computed by, the processor(s) 320.

The network device 318 may include one or more transceiver(s) 326 that may include RF transmitter and/or receiver circuitry that use the antenna(s) 328 of the network device 318 to facilitate signaling (e.g., the signaling 334) to and/or from the network device 318 with other devices (e.g., the wireless device 302) according to corresponding RATs.

The network device 318 may include one or more antenna(s) 328 (e.g., one, two, four, or more). In aspects having multiple antenna(s) 328, the network device 318 may perform MIMO, digital beamforming, analog beamforming, beam steering, etc., as has been described.

The network device 318 may include one or more interface(s) 330. The interface(s) 330 may be used to provide input to or output from the network device 318. For example, a network device 318 that is a base station may include interface(s) 330 made up of transmitters, receivers, and other circuitry (e.g., other than the transceiver(s) 326/antenna(s) 328 already described) that enables the base station to communicate with other equipment in a core network, and/or that enables the base station to communicate with external networks, computers, databases, and the like for purposes of operations, administration, and maintenance of the base station or other equipment operably connected thereto.

In accordance with at least one aspect, instructions 308 of memory 306 may comprise instructions to apply a C-DRX related timer value based on LCH allowance. In accordance with at least one aspect, instructions 324 of memory 322 may comprise instructions to enable selection of a C-DRX related timer value based on LCH allowance. Examples detailing such operation of wireless device 302, such as UE 102 or UE 104, or network device 318, such as BS 112 or BS 114, to effect C-DRX related timer value selection based on LCH allowance, and at least one method for effecting C-DRX related timer value selection based on LCH allowance are disclosed herein.

C-DRX Related Timer Value Selection Based on Logical Channel Allowance

Figure 4:
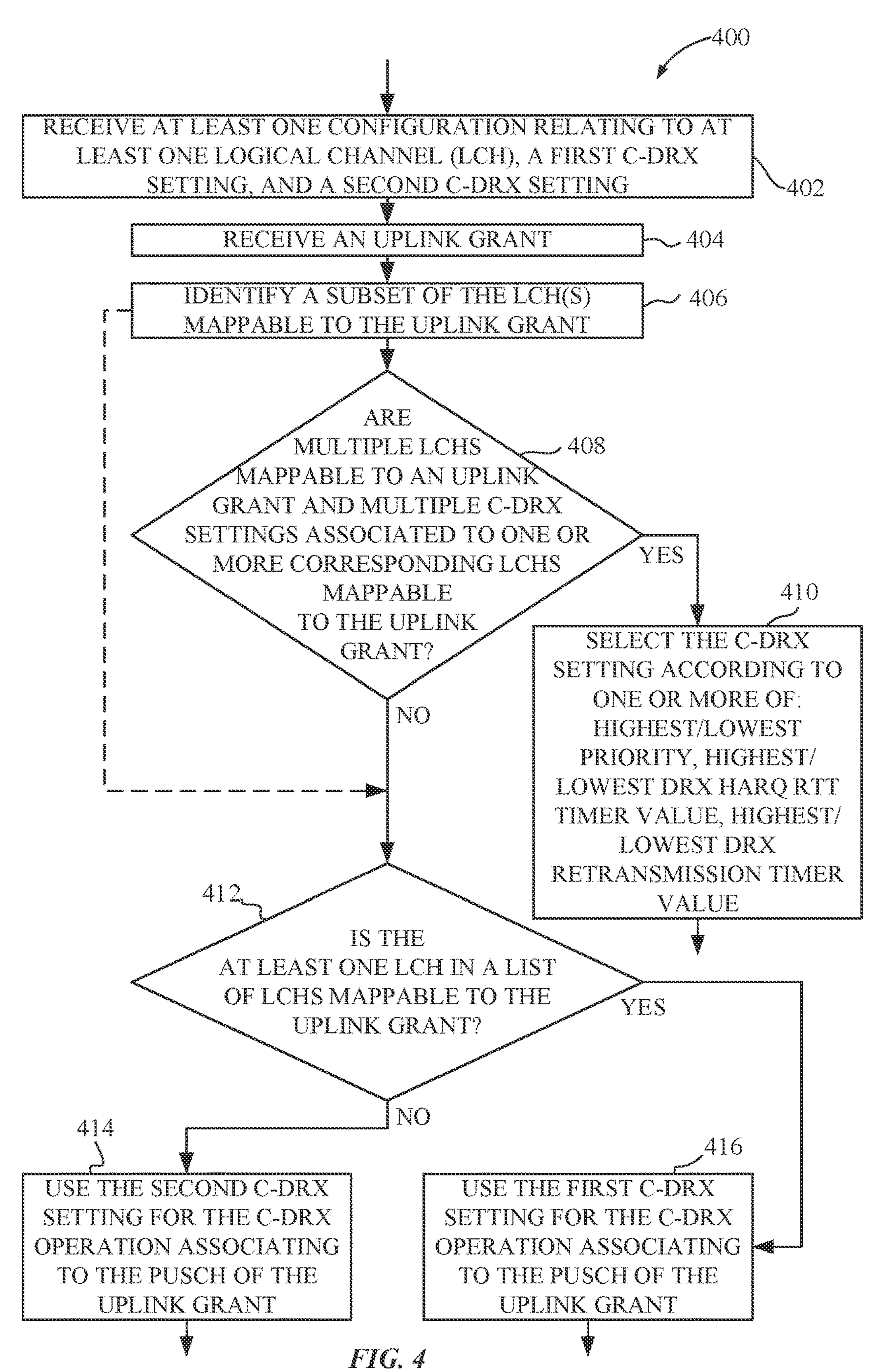
FIG. 4 is flow diagram illustrating a method for selection of a C-DRX related timer value setting in accordance with at least one aspect.

FIG. 4 is flow diagram illustrating a method 400 for selection of a C-DRX related timer value setting in accordance with at least one aspect. At block 402, at least one configuration relating to at least one logical channel (LCH), a first C-DRX setting, and a second C-DRX setting are received at a UE. For example, configurations of mapping restrictions for at least one LCH, a list of LCHs with C-DRX adaptation considerations, a first C-DRX setting, and a second C-DRX setting can be received at a UE. From block 402, method 400 continues to block 404. At block 404, an uplink grant is received at the UE. From block 404, method 400 continues to block 406. At block 406, a subset of the at least on LCH mappable to the uplink grant is identified. From block 406, method 400 continues to decision block 408. At decision block 408, a decision is made as to whether or not multiple LCHs are mappable to an uplink grant and multiple C-DRX settings associated with one or more corresponding LCHs are mappable to the uplink grant. The term "mappable," as used herein, includes both "allowed to be mapped" and actually "mapped." If the conditions of decision block 408 are satisfied, method 400 continues to block 410. At block 410, the C-DRX setting is selected according to one of the following criteria: the C-DRX setting associated with the LCH with the highest priority among the LCHs that are allowed to be or are actually mapped to the uplink grant, the C-DRX setting associated with the LCH with the lowest priority among the LCHs that are allowed to be or are actually mapped to the uplink grant, the C-DRX setting associated with the LCH with the highest discontinuous reception (DRX) hybrid automatic repeat request (HARQ) round trip time (RTT) timer value among the LCHs that are allowed to be or are actually mapped to the uplink grant, the C-DRX setting associated with the LCH with the lowest DRX HARQ RTT timer value among the LCHs that are allowed to be or are actually mapped to the uplink grant, the C-DRX setting associated with the LCH with the highest DRX retransmission timer value among the LCHs that are allowed to be or are actually mapped to the uplink grant, and the C-DRX setting associated with the LCH with the lowest DRX retransmission timer value among the LCHs that are allowed to be or are actually mapped to the uplink grant.

If the conditions of decision block 408 are not satisfied, method 400 continues to decision block 412. In some aspects, method 400 can proceed directly from block 406 to decision block 412, as shown by a dashed arrow. In some aspects, decision block 408 and block 410 can be omitted from method 400. At decision block 412, a decision is made as to whether a specific LCH is mappable to the uplink grant. For example, a decision can be made as to whether there are any LCHs in a list of LCHs with C-DRX adaptation considerations that are mappable to the uplink grant. The list of LCHs can be communicated from the BS to the UE. If the condition of decision block 412 is met, method 400 continues to block 416, where the first C-DRX setting is used for the C-DRX operation associated with the physical uplink shared channel (PUSCH) of the uplink grant. If the condition of decision block 412 is not met, method 400 continues to block 414, where the second C-DRX setting is used for the C-DRX operation associated with the PUSCH of the uplink grant. In some aspects, decision block 412 and blocks 414 and 416 can be omitted from method 400.

Figure 5:
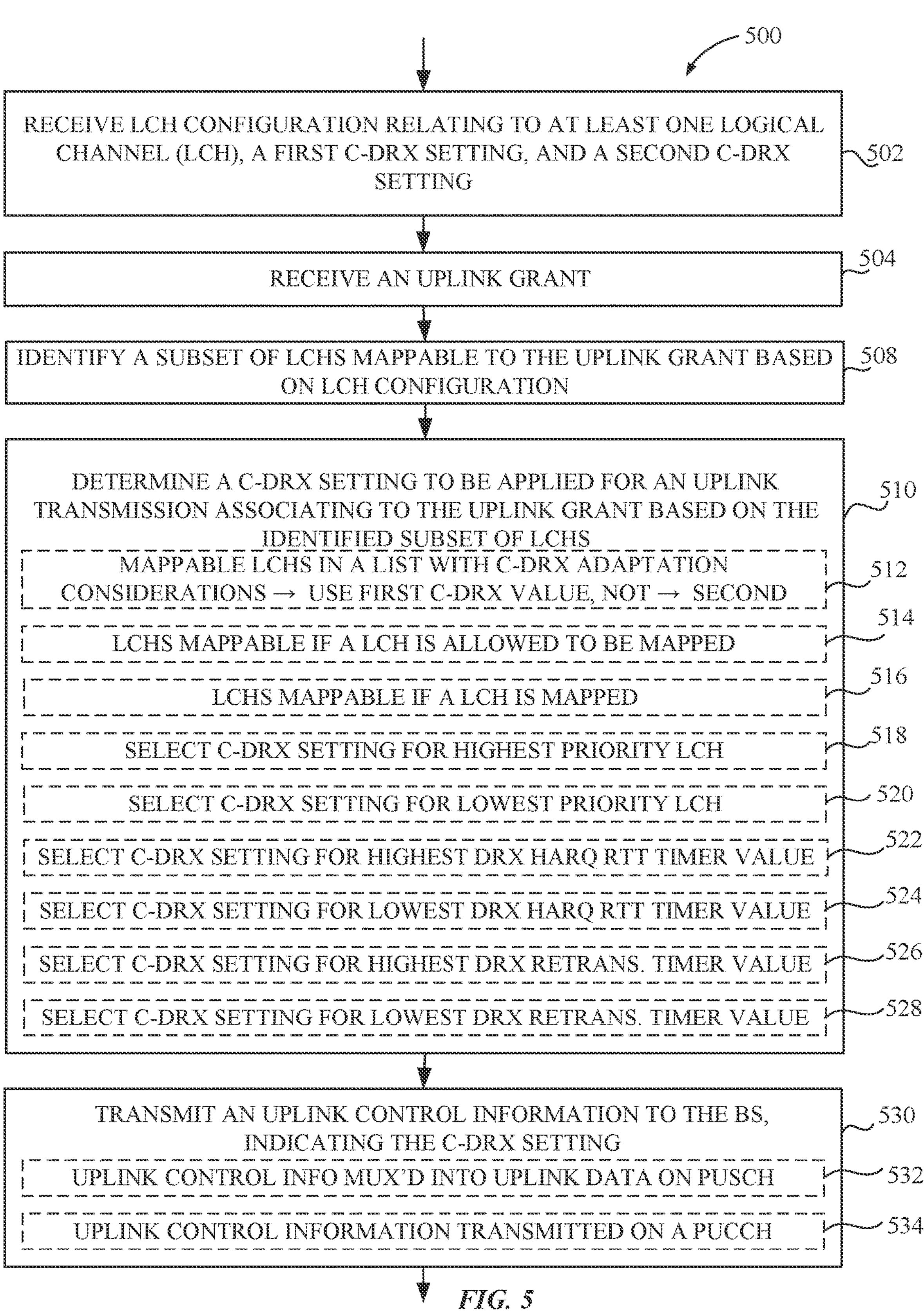
FIG. 5 is flow diagram illustrating a method for selection of a C-DRX related timer value setting in accordance with at least one aspect.

FIG. 5 is flow diagram illustrating a method 500 for selection of a C-DRX related timer value setting in accordance with at least one aspect. At block 502, a LCH configuration, a first C-DRX setting, and a second C-DRX setting are received at a UE from a BS. As an example, configurations of LCH mapping restrictions, a list of LCHs with C-DRX adaptation considerations, a first C-DRX setting, and a second C-DRX setting are received at a UE. From block 502, method 500 continues to block 504. At block 504, an uplink grant is received at the UE. The uplink grant may be received as a configured grant of a PUSCH. From block 504, method 500 continues to block 508. At block 508, a subset of LCHs that is mappable to the uplink grant is identified, at the UE, based on the LCH mapping restrictions. From block 508, method 500 continues to block 510. At block 510, a C-DRX setting to be applied for an uplink transmission associated with the uplink grant is determined based on the subset of LCHs. For example, a C-DRX setting can be determined based on whether the list of LCHs is mappable to the uplink grant with the mapping restriction. Block 510 optionally includes one or more of subblocks 512, 514, 516, 518, 520, 522, 524, 526. and 528. At subblock 512, if at least one LCH of the list of LCHs is mappable to the uplink grant, a first C-DRX value is selected to be used. If no LCH of the list of LCHs is mappable to the uplink grant, a second C-DRX value is selected to be used. At subblock 514, the LCHs are deemed to be "mappable" (within the scope of block 510) if a LCH is allowed to be mapped. At subblock 516, the LCHs are deemed to be "mappable" (within the scope of block 510) if a LCH is mapped. If an aspect is implemented so as to include both optional subblocks 514 and 516, then the LCHs are deemed to be "mappable" if a LCH is allowed to be mapped or is mapped (consistent with the generally applicable definition of "mappable" used herein). At subblock 518, a C-DRX setting is selected according to the highest priority LCH among the LCHs that are mappable to the uplink grant. At subblock 520, a C-DRX setting is selected according to the lowest priority LCH among the LCHs that are mappable to the uplink grant. At subblock 522, a C-DRX setting is selected according to the highest DRX HARQ RTT timer value among the LCHs that are mappable to the uplink grant. At subblock 524, a C-DRX setting is selected according to the lowest DRX HARQ RTT timer value among the LCHs that are mappable to the uplink grant. At subblock 526, a C-DRX setting is selected according to the highest DRX retransmission timer value among the LCHs that are mappable to the uplink grant. At subblock 528, a C-DRX setting is selected according to the lowest DRX retransmission timer value among the LCHs that are mappable to the uplink grant.

From block 510, method 500 continues to block 530. At block 530, uplink control information (UCI) is transmitted to the BS, indicating the selected C-DRX setting. Block 530 optionally includes one or more of subblocks 532 and 534. At subblock 532, the UCI is multiplexed into uplink data on a PUSCH. At subblock 534, the UCI is transmitted on a physical uplink control channel (PUCCH).

Figure 6:
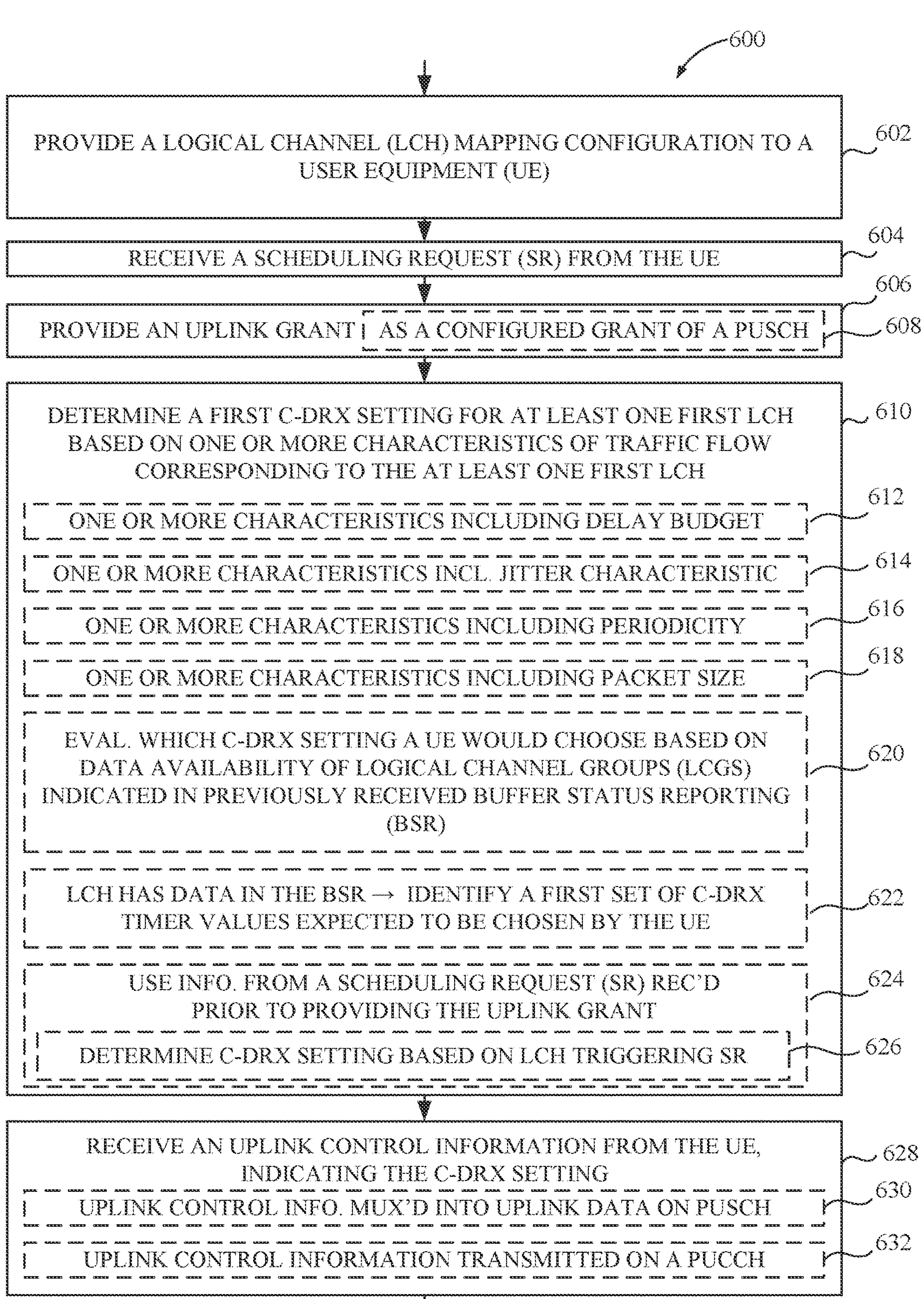
FIG. 6 is flow diagram illustrating a method for selection of a C-DRX related timer value setting in accordance with at least one aspect.

FIG. 6 is flow diagram illustrating a method 600 for selection of a C-DRX related timer value setting in accordance with at least one aspect. At block 602, a LCH mapping configuration is provided, by a BS, to a UE. The LCH mapping configuration comprises a mapping restriction for at least one LCH. The LCH mapping configuration may further comprise a list of LCHs with C-DRX adaptation considerations. From block 602, method 600 continues to block 604. At block 604, a scheduling request (SR) is received, at the BS, from the UE. From block 604, method 600 continues to block 606. At block 606, an uplink grant is provided, by the BS, to the UE. Block 606 optionally includes subblock 608. At subblock 608, the uplink grant is provided as a configured grant of a PUSCH. From block 606, method 600 continues to block 610. At block 610, a first C-DRX setting is determined for at least one first LCH based on one or more characteristics of traffic flow corresponding to the at least one first LCH. Block 606 may optionally include one or more of subblocks 612, 614, 616, 618, 620, 622, and 624. At subblock 612, the one or more characteristics includes a delay budget. At subblock 614, the one or more characteristics includes a jitter characteristic. At subblock 616, the one or more characteristics includes a periodicity. At subblock 618, the one or more characteristics includes a packet size. At subblock 620, evaluation of which C-DRX setting a UE would choose is performed, at the BS, based on data availability of logical channel groups (LCGs) indicated in previously received buffer status reporting (BSR). At subblock 622, if an LCH has data in the BSR, a first set of C-DRX related timer values expect to be chosen by the UE is identified at the BS. At subblock 624, information from a scheduling request (SR) received prior to providing the uplink grant is used, at the BS, to evaluate which C-DRX setting a UE would choose. Subblock 624 may optionally include subblock 626. At subblock 626, a C-DRX setting is determined, at the BS, based on a LCH triggering the SR. From block 610, method 600 continues to block 628. At block 628, an UCI is received from the UE. The UCI indicates the C-DRX setting. Block 628 may optionally include at least one of subblock 630 and subblock 632. At subblock 630, the UCI is multiplexed into uplink data on PUSCH. At subblock 632, the UCI is transmitted on PUCCH.

Figures 7, 8:
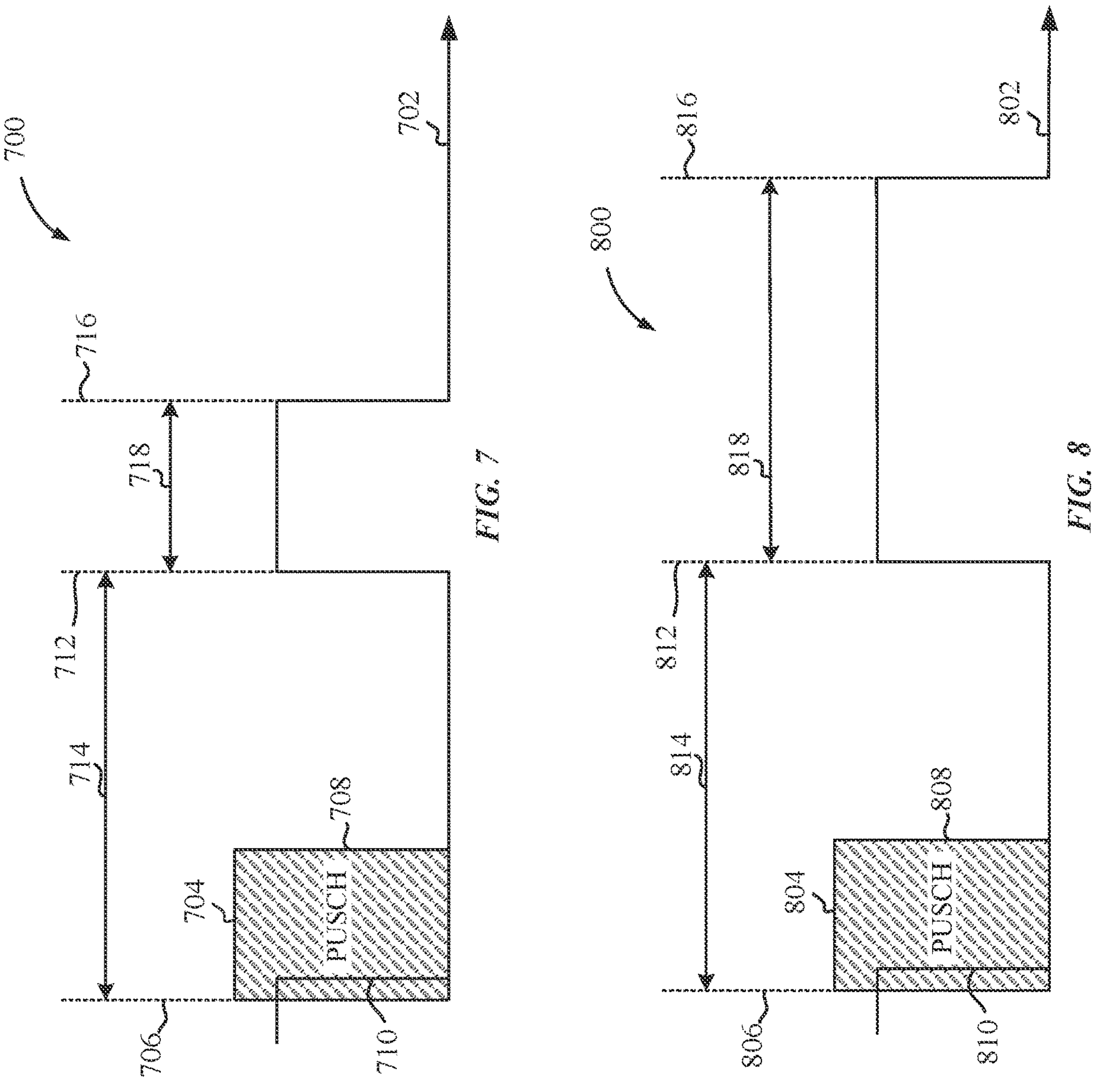
FIG. 7 is timing diagram illustrating a temporal relationship of selection of a shorter C-DRX related timer value selection based on a mappable logical channel (LCH) in accordance with at least one aspect.
FIG. 8 is timing diagram illustrating a temporal relationship of selection of a longer C-DRX related timer value selection based on a non-mappable LCH in accordance with at least one aspect.

FIG. 7 is timing diagram illustrating a temporal relationship 700 of selection of a shorter C-DRX related timer value selection based on a mappable LCH in accordance with at least one aspect. Temporal relationship 700 comprises a waveform 702 showing a duration 718 corresponding to a C-DRX related timer value in relation to a PUSCH communication instance 704. PUSCH communication instance 704 begins at time 706 and continues to time 708. During PUSCH communication instance 704, at time 710, waveform 702 transitions to an inhibited state until time 712, allowing the UE transmitting the PUSCH communication instance to save power by entering a quiescent (e.g., sleep) state, according to DRX HARQ RTT timer value corresponding to duration 714 from time 706 to time 712 for the uplink (UL) from the UE to the BS. At time 712, waveform 702 transitions to an uninhibited state until time 716, allowing the UE transmitting the PUSCH communication instance to operate in a receive state, such that the UE is active to receive downlink (DL) communication from a BS, according to a DRX retransmission timer value corresponding to duration 718 from time 712 to time 716 for the UL. At time 716, waveform 702 transitions to the quiescent (e.g., sleep) state, in which UE may save power. Duration 718 can be determined by selection of a C-DRX related timer value based on LCH allowance, as described herein. As shown, duration 718 of FIG. 7 can be shorter than duration 818 of FIG. 8, allowing the UE spend less time consuming power in the receive state and more time saving power in the quiescent state based on the condition depicted in FIG. 7 of a LCH being mappable onto the uplink grant of PUSCH communication instance 704 as compared to the condition depicted in FIG. 8 of a LCH not being mappable onto the uplink grant of PUSCH communication instance 804, where duration 818 is longer. Alternatively, in some aspects, a longer duration (e.g., duration 818) can be used on a condition of a LCH being mappable onto the uplink grant of a PUSCH communication instance, and a shorter duration (e.g., duration 718) can be used on a condition of a LCH not being mappable onto the uplink grant of a PUSCH communication instance.

FIG. 8 is timing diagram illustrating a temporal relationship 800 of selection of a longer C-DRX related timer value selection based on a non-mappable LCH in accordance with at least one aspect. Temporal relationship 800 comprises a waveform 802 showing a duration 818 corresponding to a C-DRX related timer value in relation to a PUSCH communication instance 804. PUSCH communication instance 804 begins at time 806 and continues to time 808. During PUSCH, at time 810, waveform 802 transitions to an inhibited state until time 812, allowing the UE transmitting the PUSCH communication instance to save power by entering a quiescent (e.g., sleep) state, according to DRX HARQ RTT timer value corresponding to duration 814 from time 806 to time 812 for the uplink (UL) from the UE to the BS. At time 712, waveform 802 transitions to an uninhibited state until time 816, allowing the UE transmitting the PUSCH communication instance to operate in a receive state, such that the UE is active to receive downlink (DL) communication from a BS, according to a DRX retransmission timer value corresponding to duration 718 from time 812 to time 816 for the UL. Duration 818 can be determined by selection of a C-DRX related timer value based on LCH allowance, as described herein. As shown, duration 718 of FIG. 6 can be shorter than duration 818 of FIG. 8, with a greater amount of time (greater by the difference between duration 818 and duration 718) of the UE, according to FIG. 8, consuming a greater amount of power in a receive state as a result of the condition of the LCH not being mappable onto the uplink grant of PUSCH communication instance 804, as compared to the UE, according to FIG. 7, being able to spend less time consuming power in the receive state and more time saving power in the quiescent state as a result of the condition depicted in FIG. 7 of a LCH being mappable onto the uplink grant of PUSCH communication instance 704.

FIG. 9 is a block diagram illustrating a wireless communication system 900 comprising a CN, a RAN, and a plurality of UEs configured to provide at least one solution for selection among a plurality of possible C-DRX related timer values in accordance with at least one aspect. Wireless communication system 900 comprises UE 902, UE 904, UE 906, RAN 106, and CN 124. UE 902, UE 904, and UE 906 may be examples of UE such as UE 102 and UE 104 of FIG. 1. As in FIG. 1, RAN 106 comprises BS 112. RAN 106 is communicatively coupled to CN 124 via connections 910, 912, and 914, which may be implemented as an example of NG interface 128 of FIG. 1. As an example, connection 910 may be implemented as a single connection. As another example, the NG interface of connection 910 can be split into two parts, a Next Generation (NG) user plane (NG-U) interface of connection 912, which carries traffic data between the RAN 106 and a User Plane Function (UPF) entity of CN 124, and the Si control plane (NG-C) interface of connection 914, which is a signaling interface between the RAN 106 and an Access and Mobility Functions (AMFs) entity of CN 124. The CN 124 can also be a 5GC 124. UE 902, UE 904, and UE 906 are communicative coupled to BS 112 via connections such as connections 908, which may be implemented as examples of a connection such as connection 108 or connection 110 of FIG. 1.

An exemplary first solution, wherein C-DRX related timer values are selected based on LCHs allowed to be mapped onto an uplink grant of a PUSCH, is illustrated with respect to UE 902. According to the first solution, a list of LCHs with C-DRX adaptation considerations, a first C-DRX setting, and a second C-DRX setting are received at UE 902. Then a C-DRX setting is selected from among the first C-DRX setting and the second C-DRX setting based on whether any LCH of the list of LCHs with C-DRX adaptation considerations is allowed to be mapped onto an uplink grant of a PUSCH.

An exemplary second solution, wherein C-DRX related timer values are selected based on LCHs mapped onto an uplink grant of a PUSCH, is illustrated with respect to UE 904. According to the second solution, a list of LCHs with C-DRX adaptation considerations, a first C-DRX setting, and a second C-DRX setting are received at UE 904, then a C-DRX setting is selected from among the first C-DRX setting and the second C-DRX setting based on whether any LCH of the list of LCHs with C-DRX adaptation considerations is mapped onto an uplink grant of a PUSCH.

An exemplary third solution, wherein C-DRX related timer values are selected based on a per-LCH C-DRX setting, is illustrated with respect to UE 906. According to the third solution, a C-DRX setting is determined for each LCH based on a characteristic of traffic flow, then a C-DRX setting is selected based on a rule, such as a ranking rule, which can rank particular attributes of a characteristic of traffic flow, such as priority, DRX-HARQ-RTT timer value, DRX retransmission timer value, or the like.

Figure 10:
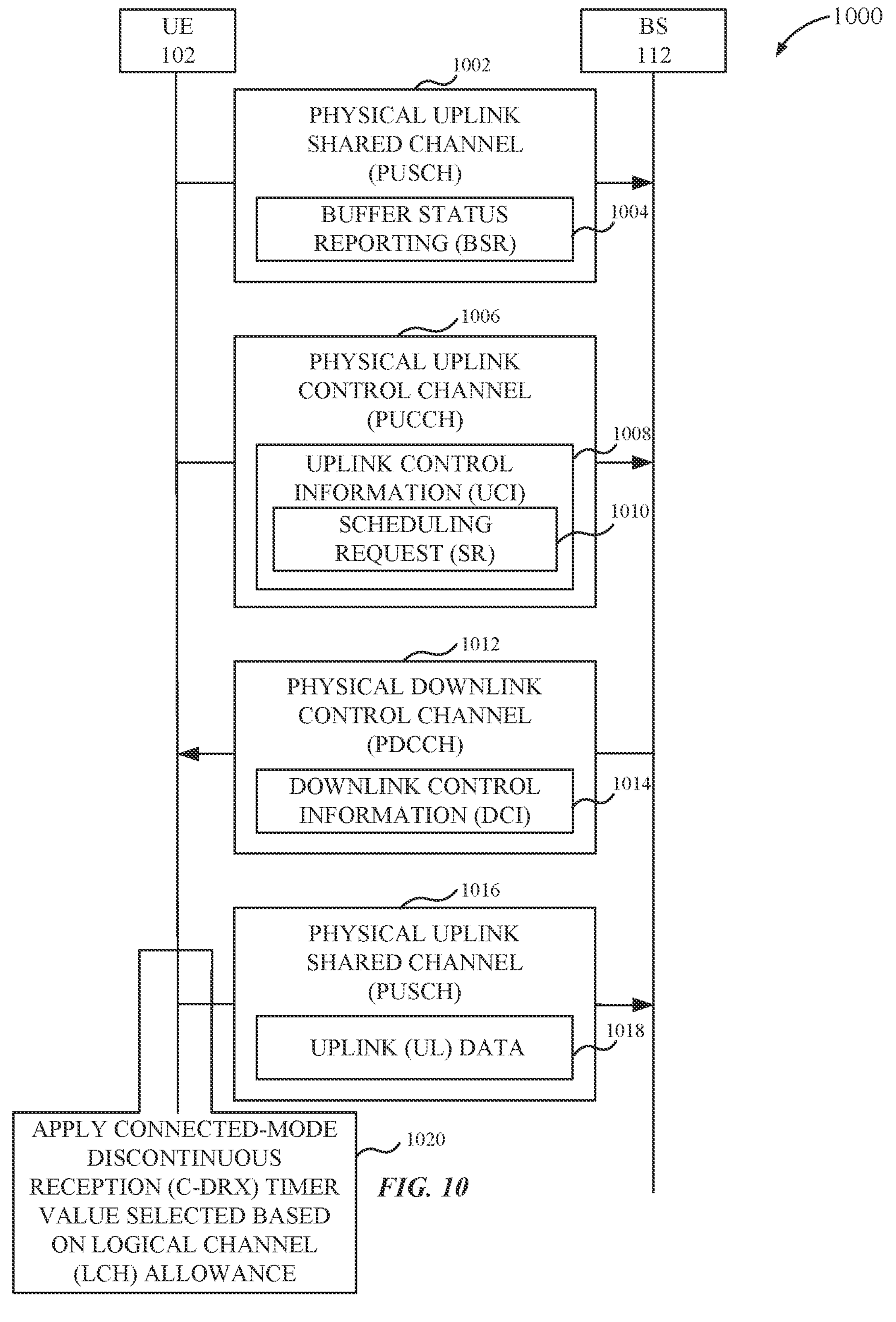
FIG. 10 is a block diagram illustrating a temporal sequence of communication instances between base station (BS) and UE, with UE applying a C-DRX related timer value selection based on LCH allowance in accordance with at least one aspect.

FIG. 10 is a block diagram illustrating a temporal sequence 1000 of communication instances between BS 112 and UE 102, with UE 102 applying a C-DRX related timer value selection based on LCH allowance in accordance with at least one aspect. Temporal sequence 1000 is depicted with respect to UE 102 and BS 112, showing channels implemented between UE 102 and BS 112. Communications along such channels are shown in advancing time as an example. A buffer status reporting (BSR) 1004 may be transmitted on PUSCH at act 1002. After the communication of BSR 1004 via PUSCH at act 1002, a UCI 1008 may be transmitted on PUCCH at act 1006. The UCI 1008 may comprise scheduling request (SR) 1010. After the communication of PUCCH at act 1006, communication of information comprising downlink control information (DCI) 1014 from BS 112 to UE 102 occurs via physical downlink control channel (PDCCH) at act 1012. After the communication of PDCCH at act 1012, communication of information comprising uplink (UL) data 1018 from UE 102 to BS 112 occurs via PUSCH at act 1016. After the initiation of communication via PUSCH at act 1016, at act 1020, UE 102 applies a C-DRX related timer value selected based on LCH allowance. According to one aspect, LCH allowance may include at least one LCH of a list of LCHs allowed to be mapped to an uplink grant. According to another aspect, LCH allowance may include at least one LCH of a list of LCHs mapped to an uplink grant.

Figure 11:
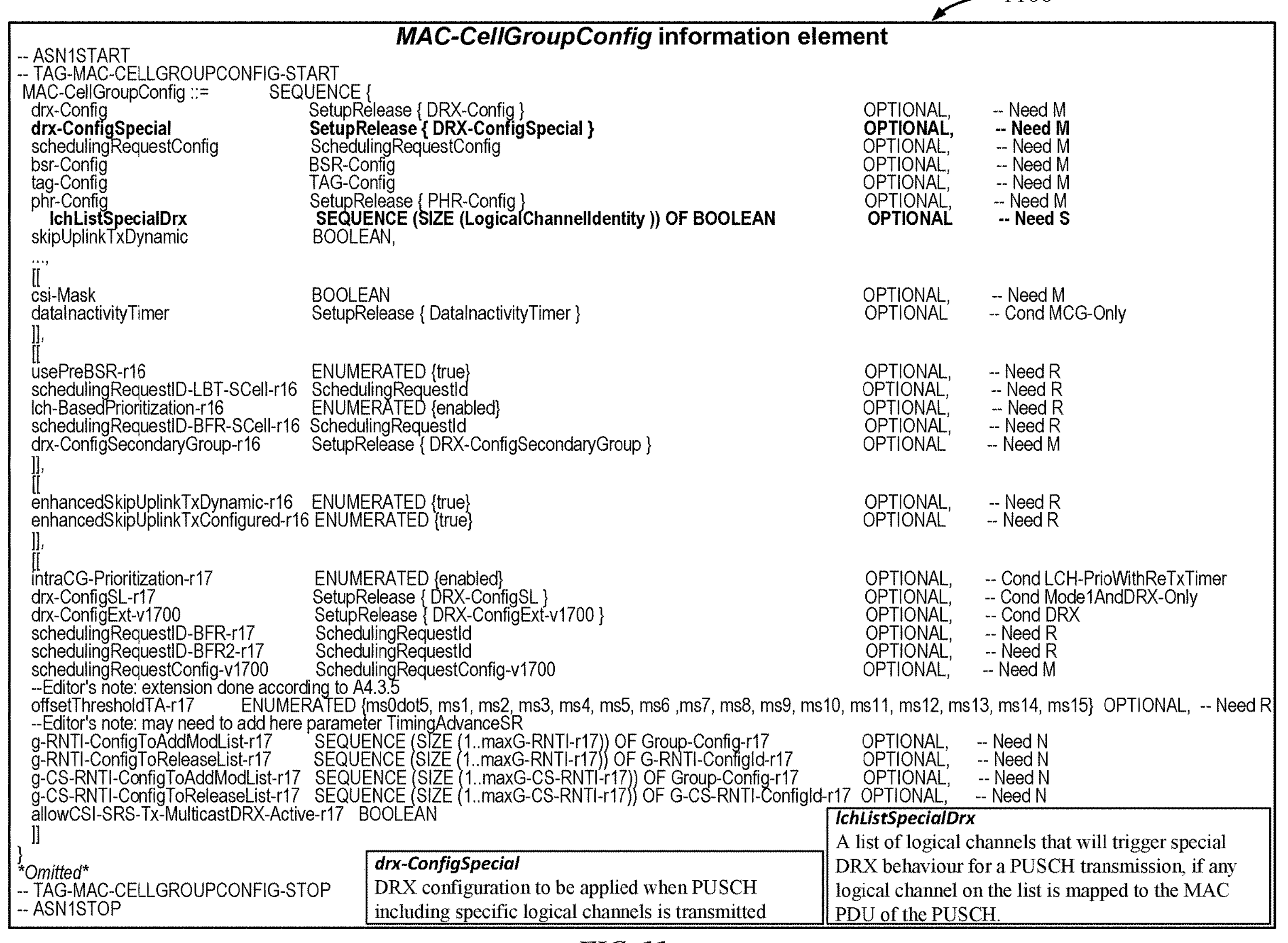
FIG. 11 is an example of a radio resource control (RRC) reconfiguration message for a C-DRX configuration in accordance with some aspects.

FIG. 11 is an example of a radio resource control (RRC) reconfiguration message for a C-DRX configuration in accordance with some aspects. In some aspects, a list of logical channels that can trigger special DRX behavior for a PUSCH transmission if any logical channel in the list is mappable to the MAC PDU of the PUSCH (e.g., 'lchList-SpecialDrx') is included in an information element (IE) (e.g., 'MAC-CellGroupConfig') 1100. In some aspects, a DRX configuration to be applied when PUSCH including specific logical channels is transmitted.

FIG. 12 is an example of a radio resource control (RRC) reconfiguration message for LCH configuration in accordance with some aspects. In some aspects, a LCH can be configured to have associated with it a C-DRX setting identifier (e.g., 'cdrxSetting'), which is included in an IE (e.g., 'LogicalChannelConfig') 1200. The IE may be configured on a per LCH basis.

Selection of a C-DRX related timer value in a grant-dependent manner can be useful. For example, UE power saving can be achieved. UE power saving can be useful, for example, for extended reality (XR) uses, such as virtual reality (VR), augmented reality (AR), and mixed reality (MR), as power saving techniques can be provided to accommodate XR service characteristics, such as periodicity, multiple flows, jitter, latency, reliability, etc.

Accordingly, an appropriate DRX timer value can be selected in accordance with a PUSCH resource, providing flexibility of DRX timing responsive to conditions. As an example, flexibility as to how long the UE should stay active (e.g., "awake") for retransmission grant monitoring can be provided. For instance, if the expected retransmission is relating to uplink traffic with a stringent packet delay budget (PDB), the UE may stay active longer to improve the likelihood a retransmission grant can be received before the delay budget expiry. On the other hand, if the PDB is so stringent and any retransmission would be too late to add much value, the UE may stay in sleep mode without having to monitor PDCCH for retransmission grant. Conversely, if the expected retransmission is relating to uplink traffic with a more relaxed PDB, the UE may stay in an active reception mode for a shorter period of time since it is anyway acceptable to receive the retransmission grant in the next on-Duration opportunity, allowing the UE to go to an inactive (e.g., "sleep") mode earlier to save power.

For a Configured Grant (CG), specific timer values for DRX on/off-durations can be associated with the CG configuration. For a Dynamic Grant (DG), specific timer values for DRX on/off-durations may be implicitly indicated via some fields of the downlink control information (DCI) allocating the PUSCH. As an example, a DRX timer value can be indicated via a HARQ process identifier (PID), allowing the UE to use specific DRX timer values when the dynamic grant is associated with certain HARQ processes identified by their HARQ PIDs. As another example, a DRX timer value can be indicated via physical interface (PHY) priority, also known as Layer 1 (L1) priority, allowing the UE to use specific DRX timer values when the dynamic grant is associated with a certain L1 priority.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units. The processor or baseband processor can be configured to execute instructions described herein.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Example 1 can include an apparatus for a User Equipment (UE), comprising a memory; and a processor coupled to the memory and configured to, when executing instructions stored in the memory, cause the UE to: receive a configuration relating to a logical channel (LCH) from a Base Station (BS); receive an uplink grant for an uplink data; identify a subset of the LCH mappable to the uplink grant based on the at least a part of the configuration; determine a connected-mode discontinuous reception (C-DRX) setting to be applied for an uplink transmission associated with the uplink grant based on the identified subset of the LCH. In some aspects, Example 1 can include causing the UE to implement a quiescent state of the UE based on the C-DRX setting. In some aspects, Example 1 can include causing the UE to determine at least one timing for starting or stopping PDCCH monitoring activities of the UE based on the C-DRX setting. In some aspects, Example 1 can include changing, at the UE, an activity level for PDCCH monitoring according to a timing based on the C-DRX setting. As an example, such an activity level may be an active level during which the UE actively monitors the PDCCH, allowing reception of communication send via the PDCCH. As an example, such an activity level may be an inactive level during which the UE inhibits monitoring of the PDCCH, allowing the UE to save energy that would otherwise be expended on PDCCH monitoring. As an example, when the activity level is an inactive level, at least a portion of the circuitry of the UE related to reception of communications via the PDCCH may be in a quiescent mode. As an example, operation of a receiver circuit for receiving communications via the PDCCH may be temporarily inhibited by changing the activity level for PDCCH monitoring (e.g., to an inactive level) according to a timing based on the C-DRX setting. For example, the UE can stop PDCCH monitoring activities of the UE based on the C-DRX setting. As an example, operation of a receiver circuit for receiving communications via the PDCCH may be reenabled by changing the activity level for PDCCH monitoring (e.g., to an active level) according to a timing based on the C-DRX setting. For example, the UE can start PDCCH monitoring activities of the UE based on the C-DRX setting.

Example 2 can include Example 1 and further wherein the LCH configuration comprises a LCH configuration element selected from a group consisting of: a LCH mapping restriction associated with a LCH of the LCHs for identification of the subset of LCHs, a list of LCHs for determining the C-DRX setting, and a parameter associated with the LCH indicating whether the LCH is in the list of LCHs for determining the C-DRX setting.

In some aspects, the LCH configuration can comprise a second LCH configuration element, which can, for example, be a LCH mapping restriction associated with a LCH of the LCHs for identification of the subset of LCHs, a list of LCHs for determining the C-DRX setting, or a parameter associated with the LCH indicating whether the LCH is in the list of LCHs for determining the C-DRX setting. In some aspects, the LCH configuration can comprise a third LCH configuration element, which can, for example, be a LCH mapping restriction associated with a LCH of the LCHs for identification of the subset of LCHs, a list of LCHs for determining the C-DRX setting, or a parameter associated with the LCH indicating whether the LCH is in the list of LCHs for determining the C-DRX setting.

It is possible that, in one case, a LCH configuration may comprise a LCH mapping restriction associated with a LCH of the LCHs for identification of the subset of LCHs as a LCH configuration element and a list of LCHs for determining the C-DRX setting as a second LCH configuration element. It is possible that, in another case, a LCH configuration may comprise a LCH mapping restriction associated with a LCH of the LCHs for identification of the subset of LCHs as a LCH configuration element and a parameter associated with the LCH indicating whether the LCH is in the list of LCHs for determining the C-DRX setting as a second LCH configuration element. It is possible that, in yet another case, a LCH configuration may comprise a list of LCHs for determining the C-DRX setting as a LCH configuration element and a parameter associated with the LCH indicating whether the LCH is in the list of LCHs for determining the C-DRX setting as a second LCH configuration element.

It is possible that, in a further case, the LCH configuration can comprise a LCH mapping restriction associated with a LCH of the LCHs for identification of the subset of LCHs as a LCH configuration element, a list of LCHs for determining the C-DRX setting as a second LCH configuration element, and a parameter associated with the LCH indicating whether the LCH is in the list of LCHs for determining the C-DRX setting as a third LCH configuration element. The foregoing examples are non-limiting as to the possible applications of ordinal labels (e.g., second LCH configuration element, third LCH configuration element, etc.) to possible types of LCH configuration elements (e.g., a LCH mapping restriction associated with a LCH of the LCHs for identification of the subset of LCHs, a list of LCHs for determining the C-DRX setting, or a parameter associated with the LCH indicating whether the LCH is in the list of LCHs for determining the C-DRX setting). In some aspects, Example 2 can include Example 1 and further wherein the LCH configuration comprises a LCH mapping restriction for the identification of the subset of LCHs and a list of LCHs to determine the C-DRX setting.

Example 3 can include Example 1 and Example 2 and further wherein, if the subset of the LCHs includes a LCH in the list of LCHs, the C-DRX setting comprises a first C-DRX related timer value; wherein, if the subset of the LCHs includes a LCH in the list of LCHs, the C-DRX setting comprises a second C-DRX related timer value.

Example 4 can include Example 1, Example, 2, Example 3, and further wherein the first C-DRX related timer value is smaller than the second C-DRX related timer value.

Example 5 can include Example 1 and further wherein the LCH is mappable to the uplink grant if the LCH is allowed to be mapped to the uplink grant based on a LCH mapping restriction configured for the LCH.

Example 6 can include Example 1 and further wherein the LCH is mappable to the uplink grant if the LCH is mapped to the uplink grant based on a LCH mapping restriction configured for the LCH.

Example 7 can include Example 1 and Example 6 and further wherein the processor is further configured to cause the UE to transmit an uplink control information to the BS, indicating the C-DRX setting.

Example 8 can include Example 1 and Example 6 and further wherein the uplink control information is multiplexed into the uplink data transmitted on a physical uplink shared channel (PUSCH).

Example 9 can include Example 1 and Example 6 and further wherein the uplink control information transmitted on a physical uplink control channel (PUCCH).

Example 10 can include Example 1 and Example 6 and further wherein the configuration relating to the LCH comprises: a first association of the LCH with a first C-DRX timer setting; and a second association of a second LCH with a second C-DRX timer setting.

Example 11 can include Example 1 and further wherein the uplink grant is a configured grant of a physical uplink shared channel (PUSCH).

Example 12 can include Example 1 and further wherein, when a plurality of C-DRX settings are associated correspondingly with the subset of LCHs, the UE selects a C-DRX setting for a physical uplink shared channel (PUSCH) based on a ranking rule.

Example 13 can include Example 1 and further wherein the ranking rule is selected from one or more of: selecting the C-DRX setting associated with the LCH with a highest priority among the mappable LCHs, selecting the C-DRX setting associated with the LCH with a lowest priority among the mappable LCHs, selecting the C-DRX setting with a highest discontinuous reception (DRX) hybrid automatic repeat request (HARQ) round trip time (RTT) timer value among the mappable LCHs, selecting the C-DRX setting with a lowest DRX HARQ RTT timer value among the mappable LCHs, selecting the C-DRX setting with a highest DRX retransmission timer value among the mappable LCHs, and selecting C-DRX setting with a lowest DRX retransmission timer value among the mappable LCHs.

Example 14 can include an apparatus for a Base Station (BS), comprising: a memory; and a processor coupled to the memory and configured to, when executing instructions stored in the memory, cause the BS to: provide a configuration relating to a first logical channel (LCH) to a User Equipment (UE); provide an uplink grant for an uplink data; and determine a first connected-mode discontinuous reception (C-DRX) setting for the first LCH based on one or more characteristics of traffic flow corresponding to the first LCH.

Example 15 can include Example 14 and further wherein the one or more characteristics of the traffic flow corresponding to the first LCH are selected from a group consisting of delay budget, jitter characteristic, periodicity, and packet size.

Example 16 can include Example 14 and further wherein the BS evaluates which C-DRX setting the UE is expected to choose based on data availability of logical channel groups (LCGs) indicated in previously received buffer status reporting (BSR).

Example 17 can include Example 14 and Example 16 and further wherein, when at least one of a plurality of LCHs comprising the first LCH is shown to have some data in the BSR, the BS identifies a first set of C-DRX related timer values expected to be chosen by the UE.

Example 18 can include Example 14 and further wherein the BS uses a scheduling request (SR) received at the BS prior to the BS issuing the uplink grant.

Example 19 can include Example 14 and Example 18 and further wherein the BS determines a C-DRX setting expected to be chosen by the UE based on which LCH among a plurality of LCHs comprising the first LCH triggers the SR received at the BS prior to the BS issuing the uplink grant.

Example 20 can include a method comprising: receiving, at a User Equipment (UE), a configuration relating to a logical channel (LCH) from a Base Station (BS); receiving, at the UE, an uplink grant for an uplink data; identifying a subset of the LCH mappable to the uplink grant based on the at least a part of the configuration; determining, at the UE, a connected-mode discontinuous reception (C-DRX) setting to be applied for an uplink transmission associated with the uplink grant based on the identified subset of the LCH; and controlling a quiescent state of the UE based on the C-DRX setting.

Example 21 can include Example 20 and further wherein, if the LCH is mappable to the uplink grant, the C-DRX setting comprises a first C-DRX related timer value; wherein, if the LCH is not mappable to the uplink grant, the C-DRX setting comprises a second C-DRX related timer value; and wherein the first C-DRX related timer value is smaller than the second C-DRX related timer value.

Example 22 can include Example 20 and further wherein the configuration relating to the LCH comprises a LCH mapping restriction for the LCH.

Example 23 can include Example 20 and further wherein the LCH is mappable to the uplink grant if the LCH is allowed to be mapped to the uplink grant based on a LCH mapping restriction configured for the LCH.

Example 24 can include Example 20 and further wherein the LCH is mappable to the uplink grant if the LCH is mapped to the uplink grant based on a LCH mapping restriction configured for the LCH.

Example 25 can include Example 20 and Example 24 and further comprising: transmitting an uplink control information to the BS, indicating the C-DRX setting.

Example 26 can include Example 20 and Example 24 and Example 25 and further wherein the uplink control information is multiplexed into the uplink data transmitted on a physical uplink shared channel (PUSCH).

Example 27 can include Example 20 and Example 24 and Example 25 and further wherein the uplink control information transmitted on a physical uplink control channel (PUCCH).

Example 28 can include Example 20 and further wherein the configuration relating to the LCH comprises: a first association of the LCH with a first C-DRX timer setting; and a second association of a second LCH with a second C-DRX timer setting.

Example 29 can include Example 20 and further wherein the uplink grant is a configured grant of a physical uplink shared channel (PUSCH).

Example 30 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) based on a rule selected from a group consisting of selecting the C-DRX setting associated with the LCH with a highest priority among the mappable LCHs, selecting the C-DRX setting associated with the LCH with a lowest priority among the mappable LCHs, selecting the C-DRX setting with a highest discontinuous reception (DRX) hybrid automatic repeat request (HARQ) round trip time (RTT) timer value among the mappable LCHs, selecting the C-DRX setting with a lowest DRX HARQ RTT timer value among the mappable LCHs, selecting the C-DRX setting with a highest DRX retransmission timer value among the mappable LCHs, selecting C-DRX setting with a lowest DRX retransmission timer value among the mappable LCHs.

Example 31 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting associated with the LCH with a highest priority among the mappable LCHs.

Example 32 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting associated with the LCH with a lowest priority among the mappable LCHs.

Example 33 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting with a highest discontinuous reception (DRX) hybrid automatic repeat request (HARQ) round trip time (RTT) timer value among the mappable LCHs.

Example 34 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting with a lowest DRX HARQ RTT timer value among the mappable LCHs.

Example 35 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting with a highest DRX retransmission timer value among the mappable LCHs.

Example 36 can include Example 20 and further comprising: when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting C-DRX setting with a lowest DRX retransmission timer value among the mappable LCHs.

Example 37 to can include Example 1 and further wherein, if the LCH is mappable to the uplink grant, the C-DRX setting comprises a first C-DRX related timer value; wherein, if the LCH is not mappable to the uplink grant, the C-DRX setting comprises a second C-DRX related timer value; and wherein the first C-DRX related timer value is smaller than the second C-DRX related timer value.

Example 37a can include Example 1 and further wherein the configuration relating to the LCH comprises a LCH mapping restriction for the LCH.

Example 38 can include Example 1 and further wherein the configuration relating to the LCH further comprises a list of LCHs comprising the LCH.

Example 39 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) based on a rule selected from a group consisting of selecting the C-DRX setting associated with the LCH with a highest priority among the mappable LCHs, selecting the C-DRX setting associated with the LCH with a lowest priority among the mappable LCHs, selecting the C-DRX setting with a highest discontinuous reception (DRX) hybrid automatic repeat request (HARQ) round trip time (RTT) timer value among the mappable LCHs, selecting the C-DRX setting with a lowest DRX HARQ RTT timer value among the mappable LCHs, selecting the C-DRX setting with a highest DRX retransmission timer value among the mappable LCHs, selecting C-DRX setting with a lowest DRX retransmission timer value among the mappable LCHs.

Example 40 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) by selecting the C-DRX setting associated with the LCH with a highest priority among the mappable LCHs.

Example 41 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) by selecting the C-DRX setting associated with the LCH with a lowest priority among the mappable LCHs.

Example 42 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) by selecting the C-DRX setting with a highest discontinuous reception (DRX) hybrid automatic repeat request (HARQ) round trip time (RTT) timer value among the mappable LCHs.

Example 43 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) by selecting the C-DRX setting with a lowest DRX HARQ RTT timer value among the mappable LCHs.

Example 44 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) by selecting the C-DRX setting with a highest DRX retransmission timer value among the mappable LCHs.

Example 45 can include Example 1 and further wherein, when a plurality of LCHs comprising the LCH are mappable LCHs and a plurality of C-DRX settings are associated correspondingly with portions of the plurality of LCHs, the UE selects a C-DRX setting for a physical uplink shared channel (PUSCH) by selecting C-DRX setting with a lowest DRX retransmission timer value among the mappable LCHs.

Example 46 can include Example 14 and further wherein the one or more characteristics of the traffic flow corresponding to the first LCH is a delay budget.

Example 47 can include Example 14 and further wherein the one or more characteristics of the traffic flow corresponding to the first LCH is a jitter characteristic.

Example 48 can include Example 14 and further wherein the one or more characteristics of the traffic flow corresponding to the first LCH is a periodicity.

Example 49 can include Example 14 and further wherein the one or more characteristics of the traffic flow corresponding to the first LCH is a packet size.

Example 50 can include a method as substantially described herein with reference to each or any combination substantially described herein, comprised in examples 1-49, and in the Detailed Description.

Example 51 can include a non-transitory computer readable medium as substantially described herein with reference to each or any combination substantially described herein, comprised in examples 1-49, and in the Detailed Description.

Example 52 can include a wireless device configured to perform any action or combination of actions as substantially described herein, comprised in examples 1-49, and in the Detailed Description.

Example 53 can include an integrated circuit configured to perform any action or combination of actions as substantially described herein, comprised in examples 1-49, and in the Detailed Description.

Example 54 can include an apparatus configured to perform any action or combination of actions as substantially described herein, comprised in examples 1-49, and in the Detailed Description.

Example 55 can include a baseband processor configured to perform any action or combination of actions as substantially described herein, comprised in examples 1-49, and in the Detailed Description.

Example 56 can include an apparatus for a User Equipment (UE), comprising a memory; and a processor coupled to the memory and operable to, when executing instructions stored in the memory, cause the UE to: receive a logical channel (LCH) configuration from a Base Station (BS); receive an uplink grant for an uplink data; identify a subset of LCHs mappable to the uplink grant based on the LCH configuration; determine a connected-mode discontinuous reception (C-DRX) setting to be applied for an uplink transmission associated with the uplink grant based on the subset of the LCHs; and change, at the UE, an activity level for PDCCH monitoring according to a timing based on the C-DRX setting.

Example 57 can include Example 56, wherein the LCH configuration comprises a LCH configuration element selected from a group consisting of: a LCH mapping restriction associated with a LCH of the LCHs for identification of the subset of LCHs, a list of LCHs for determining the C-DRX setting, and a parameter associated with the LCH indicating whether the LCH is in the list of the LCHs for determining the C-DRX setting.

Example 58 can include Examples 56 and 57, wherein, if the subset of the LCHs includes a listed LCH in the list of LCHs, the C-DRX setting comprises a first C-DRX related timer value; and wherein, if the subset of the LCHs does not include the listed LCH in the list of LCHs, the C-DRX setting comprises a second C-DRX related timer value.

Example 59 can include Examples 56, 57, and 58, wherein the first C-DRX related timer value is smaller than the second C-DRX related timer value.

Example 60 can include Example 56, wherein the subset of LCHs is mappable to the uplink grant if the subset of LCHs is allowed to be mapped to the uplink grant based on a LCH mapping restriction.

Example 61 can include Example 56, wherein the subset of LCHs is mappable to the uplink grant if the subset of LCHs is mapped to the uplink grant based on a LCH mapping restriction.

Example 62 can include Examples 56 and 61, wherein the processor is further operable to cause the UE to transmit an uplink control information (UCI) to the BS, indicating the C-DRX setting.

Example 63 can include Examples 56, 61, and 62, wherein the uplink control information is multiplexed into the uplink data transmitted on a physical uplink shared channel (PUSCH).

Example 64 can include Examples 56, 61, and 62, wherein the uplink control information transmitted on a physical uplink control channel (PUCCH).

Example 65 can include Example 56, wherein the LCH configuration comprises: a first association of a first LCH with a first C-DRX setting; and a second association of a second LCH with a second C-DRX setting.

Example 66 can include Example 56, wherein the uplink grant is a configured grant of uplink data transmitted on a physical uplink shared channel (PUSCH).

Example 67 can include Example 56, wherein, when a plurality of C-DRX settings are associated correspondingly with the subset of LCHs, the UE selects a C-DRX setting for a physical uplink shared channel (PUSCH) based on a ranking rule.

Example 68 can include Example 56 and Example 67, wherein the ranking rule is selected from one or more of: selecting the C-DRX setting associated with a highest priority LCH with a highest priority among the subset of the LCHs mappable to the uplink grant, selecting the C-DRX setting associated with a lowest priority LCH with a lowest priority among the subset of the LCHs mappable to the uplink grant, selecting the C-DRX setting with a highest discontinuous reception (DRX) hybrid automatic repeat request (HARQ) round trip time (RTT) timer value among the mappable LCHs, selecting the C-DRX setting with a lowest DRX HARQ RTT timer value among the mappable LCHs, selecting the C-DRX setting with a highest DRX retransmission timer value among the mappable LCHs, and selecting C-DRX setting with a lowest DRX retransmission timer value among the mappable LCHs.

Example 69 can include an apparatus for a Base Station (BS), comprising: a memory; and a processor coupled to the memory and operable to, when executing instructions stored in the memory, cause the BS to: provide a configuration relating to a first logical channel (LCH) to a User Equipment (UE); provide an uplink grant for an uplink data; determine a first connected-mode discontinuous reception (C-DRX) setting for the first LCH based on a characteristic of traffic flow corresponding to the first LCH; and use the C-DRX setting to set timing for transmission via the first LCH to the UE.

Example 70 can include Example 69, wherein the characteristic of the traffic flow corresponding to the first LCH are selected from one or more of delay budget, jitter characteristic, periodicity, and packet size.

Example 71 can include Example 69, wherein the BS evaluates which C-DRX setting the UE is expected to choose based on data availability of logical channel groups (LCGs) indicated in a previously received buffer status reporting (BSR).

Example 72 can include Examples 69 and 71, wherein, when at least one of a plurality of LCHs comprising the first LCH is shown to have some data in the previously received BSR, the BS identifies a first set of C-DRX related timer values expected to be chosen by the UE.

Example 73 can include Example 69, wherein the BS uses a scheduling request (SR) received at the BS prior to the BS issuing the uplink grant.

Example 74 can include Examples 69 and 73, wherein the BS determines a C-DRX setting expected to be chosen by the UE based on a triggering LCH among a plurality of LCHs comprising the first LCH wherein the triggering LCH triggers the SR received at the BS prior to the BS issuing the uplink grant.

Example 75 can include a method comprising: receiving, at a User Equipment (UE), a configuration relating to a logical channel (LCH) from a Base Station (BS); receiving, at the UE, an uplink grant for an uplink data; identifying a subset of the LCH mappable to the uplink grant based on the at least a part of the configuration; determining, at the UE, a connected-mode discontinuous reception (C-DRX) setting to be applied for an uplink transmission associated with the uplink grant based on the identified subset of the LCH; and changing, at the UE, an activity level for PDCCH monitoring according to a timing based on the C-DRX setting.

Example 76 can include Example 75, wherein, if the LCH is mappable to the uplink grant, the C-DRX setting comprises a first C-DRX related timer value; wherein, if the LCH is not mappable to the uplink grant, the C-DRX setting comprises a second C-DRX related timer value; and wherein the first C-DRX related timer value is smaller than the second C-DRX related timer value.

Example 77 can include Example 75, wherein the configuration relating to the LCH comprises a LCH mapping restriction for the LCH.

Example 78 can include Example 75, wherein the LCH is mappable to the uplink grant if the LCH is allowed to be mapped to the uplink grant based on a LCH mapping restriction configured for the LCH.

Example 79 can include Example 75, wherein the LCH is mappable to the uplink grant if the LCH is mapped to the uplink grant based on a LCH mapping restriction configured for the LCH.

Example 80 can include Example 75 and Example 79 and also transmitting an uplink control information to the BS, indicating the C-DRX setting.

Example 81 can include Example 75, Example 79, and Example 80, wherein the uplink control information is multiplexed into the uplink data transmitted on a physical uplink shared channel (PUSCH).

Example 82 can include Example 75, Example 79, and Example 80, wherein the uplink control information transmitted on a physical uplink control channel (PUCCH).

Example 83 can include Example 75, wherein the configuration relating to the LCH comprises a first association of the LCH with a first C-DRX timer setting and a second association of a second LCH with a second C-DRX timer setting.

Example 84 can include Example 75, wherein the uplink grant is a configured grant of a physical uplink shared channel (PUSCH).

Example 85 can include Example 75 and also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) based on a rule selected from a group consisting of selecting the C-DRX setting associated with the LCH with a highest priority among the mappable LCHs, selecting the C-DRX setting associated with the LCH with a lowest priority among the mappable LCHs, selecting the C-DRX setting with a highest discontinuous reception (DRX) hybrid automatic repeat request (HARQ) round trip time (RTT) timer value among the mappable LCHs, selecting the C-DRX setting with a lowest DRX HARQ RTT timer value among the mappable LCHs, selecting the C-DRX setting with a highest DRX retransmission timer value among the mappable LCHs, selecting C-DRX setting with a lowest DRX retransmission timer value among the mappable LCHs.

Example 86 can include Example 75 and also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting associated with the LCH with a highest priority among the mappable LCHs.

Example 87 can include Example 75 and also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting associated with the LCH with a lowest priority among the mappable LCHs.

Example 88 can include Example 75 can also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting with a highest discontinuous reception (DRX) hybrid automatic repeat request (HARQ) round trip time (RTT) timer value among the mappable LCHs.

Example 89 can include Example 75 and also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting with a lowest DRX HARQ RTT timer value among the mappable LCHs.

Example 90 can include Example 75 and also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting the C-DRX setting with a highest DRX retransmission timer value among the mappable LCHs.

Example 91 can include Example 75 and also, when a plurality of LCHs comprising the LCH are mappable LCHs and a plurality of C-DRX settings are associated correspondingly with portions of the plurality of LCHs, selecting, at the UE, a C-DRX setting for a physical uplink shared channel (PUSCH) by selecting C-DRX setting with a lowest DRX retransmission timer value among the mappable LCHs.

Example 92 can include a method as substantially described herein with reference to each or any combination substantially described herein, comprised in examples 56-91, and in the Detailed Description.

Example 93 can include a non-transitory computer readable medium as substantially described herein with reference to each or any combination substantially described herein, comprised in examples 56-91, and in the Detailed Description.

Example 94 can include a wireless device configured to perform any action or combination of actions as substantially described herein, comprised in examples 56-91, and in the Detailed Description.

Example 95 can include an integrated circuit configured to perform any action or combination of actions as substantially described herein, comprised in examples 56-91, and in the Detailed Description.

Example 96 can include an apparatus configured to perform any action or combination of actions as substantially described herein, comprised in examples 56-91, and in the Detailed Description.

Example 97 can include a baseband processor configured to perform any action or combination of actions as substantially described herein, comprised in examples 1-36, and in the Detailed Description.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communication media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal or apparatus.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The present disclosure is described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable or non-transitory computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An apparatus for a User Equipment (UE), comprising:

a memory; and a processor coupled to the memory and operable to, when executing instructions stored in the memory, cause the UE to:

receive a logical channel (LCH) configuration from a base station;

receive an uplink grant for an uplink transmission;

identify a subset of LCHs mappable to the uplink grant based on the LCH configuration;

determine a connected-mode discontinuous reception (C-DRX) setting to be applied for the uplink transmission associated with the uplink grant based on the subset of the LCHs, wherein the determination includes selecting a C-DRX setting for a physical uplink shared channel (PUSCH) based on a ranking rule when a plurality of C-DRX settings are associated correspondingly with the subset of LCHs; and change, at the UE, an activity level for physical downlink control channel (PDCCH) monitoring according to a timing based on the C-DRX setting.

2. The apparatus of claim 1, wherein the LCH configuration comprises a LCH configuration element selected from a group comprising:

a LCH mapping restriction associated with a LCH of the LCHs for identification of the subset of LCHs;

a list of LCHs for determining the C-DRX setting; and a parameter associated with the LCH indicating whether the LCH is in the list of the LCHs for determining the C-DRX setting.

3. The apparatus of claim 2, wherein, if the subset of the LCHs includes a listed LCH in the list of LCHs, the C-DRX setting comprises a first C-DRX related timer value; and wherein, if the subset of the LCHs does not include the listed LCH in the list of LCHs, the C-DRX setting comprises a second C-DRX related timer value.

4. The apparatus of claim 3, wherein the first C-DRX related timer value is smaller than the second C-DRX related timer value.

5. The apparatus of claim 1, wherein the subset of LCHs is mappable to the uplink grant if the subset of LCHs is allowed to be mapped to the uplink grant based on a LCH mapping restriction.

6. The apparatus of claim 1, wherein the subset of LCHs is mappable to the uplink grant if the subset of LCHs is mapped to the uplink grant based on a LCH mapping restriction.

7. The apparatus of claim 1, wherein the ranking rule is selected from one or more of:

selecting the C-DRX setting associated with a highest priority LCH with a highest priority among the subset of the LCHs mappable to the uplink grant;

selecting the C-DRX setting associated with a lowest priority LCH with a lowest priority among the subset of the LCHs mappable to the uplink grant;

selecting the C-DRX setting with a highest discontinuous reception (DRX) hybrid automatic repeat request (HARQ) round trip time (RTT) timer value among the subset of LCHs mappable to the uplink grant;

selecting the C-DRX setting with a lowest DRX HARQ RTT timer value among the subset of LCHs mappable to the uplink grant;

selecting the C-DRX setting with a highest DRX retransmission timer value among the subset of LCHs mappable to the uplink grant; or selecting the C-DRX setting with a lowest DRX retransmission timer value among the subset of LCHs mappable to the uplink grant.

8. An apparatus for a base station, comprising:

a memory; and a processor coupled to the memory and operable to, when executing instructions stored in the memory, cause the base station to:

provide, for transmission to a User Equipment (UE), a logical channel (LCH) configuration including a LCH mapping restriction and a list of LCHs for determining a connected-mode discontinuous reception (C-DRX) setting for the UE;

provide, for transmission to the UE, an uplink grant for an uplink transmission;

identify a subset of LCHs mappable to the uplink grant based on the LCH mapping restriction;

determine the C-DRX setting for the UE based on whether the list of LCHs for determining the C-DRX setting includes at least one LCH from the subset of LCHs mappable to the uplink grant; and use the C-DRX setting for the UE to set timing for a transmission to the UE.

9. The apparatus of claim 8, wherein determining the C-DRX setting for the UE is further based on one or more of: a delay budget, a jitter characteristic, a periodicity, or a packet size.

10. The apparatus of claim 8, wherein the processor further causes the base station to evaluate which C-DRX setting the UE is expected to choose based on data availability of logical channel groups (LCGs) indicated in a buffer status reporting (BSR) previously received from the UE.

11. The apparatus of claim 10 wherein the transmission to the UE is on a first LCH, and wherein determining the C-DRX setting for the UE is further based on whether data for the first LCH was contained in the previously received BSR.

12. The apparatus of claim 8 wherein the processor further causes the base station to receive a scheduling request (SR) before providing the uplink grant.

13. The apparatus of claim 12 wherein determining the C-DRX setting for the UE is further based on a LCH that triggers the SR.

14. The apparatus of claim 8, wherein the processor further causes the base station to:

determine a first C-DRX setting if the list of LCHs for determining the C-DRX setting includes at least one LCH from the subset of LCHs mappable to the uplink grant; and determine a second C-DRX setting if the list of LCHs for determining the C-DRX setting does not include at least one LCH from the subset of LCHs mappable to the uplink grant.

15. The apparatus of claim 14, wherein the first C-DRX setting comprises a first set of C-DRX related timer values for a physical uplink shared channel (PUSCH) associated with the uplink grant, and wherein the second C-DRX setting comprises a second set of C-DRX related timer values for the PUSCH associated with the uplink grant.

16. A method for a User Equipment (UE), the method comprising:

receiving a logical channel (LCH) configuration from a base station;

receiving an uplink grant for an uplink transmission;

identifying a subset of LCHs mappable to the uplink grant based on the LCH configuration;

determining a connected-mode discontinuous reception (C-DRX) setting to be applied for the uplink transmission associated with the uplink grant based on the identified subset of LCHs, wherein the C-DRX setting comprises a first C-DRX related timer value if a pre-determined LCH is mappable to the uplink grant according to the subset of LCHs, and wherein the C-DRX setting comprises a second C-DRX related timer value, greater than the first C-DRX related timer value, if the pre-determined LCH is not mappable to the uplink grant according to the subset of LCHs; and changing an activity level for physical downlink control channel (PDCCH) monitoring according to a timing based on the C-DRX setting.

17. The method of claim 16 wherein the LCH configuration comprises a LCH mapping restriction for the LCH.

18. The method of claim 16, wherein the LCH is mappable to the uplink grant if the LCH is allowed to be mapped to the uplink grant based on a LCH mapping restriction configured for the LCH.

19. The method of claim 16, wherein the LCH is mappable to the uplink grant if the LCH is mapped to the uplink grant based on a LCH mapping restriction configured for the LCH.

20. The method of claim 16, further comprising:

when a plurality of LCHs comprising the LCH are mappable LCHs and a plurality of C-DRX settings are associated correspondingly with portions of the plurality of LCHs, selecting a C-DRX setting for a physical uplink shared channel (PUSCH) by performing one or more of:

selecting the C-DRX setting associated with the LCH with a highest priority among the mappable LCHs;

selecting the C-DRX setting associated with the LCH with a lowest priority among the mappable LCHs;

selecting the C-DRX setting with a highest discontinuous reception (DRX) hybrid automatic repeat request (HARQ) round trip time (RTT) timer value among the mappable LCHs;

selecting the C-DRX setting with a lowest DRX HARQ RTT timer value among the mappable LCHs;

selecting the C-DRX setting with a highest DRX retransmission timer value among the mappable LCHs; or selecting the C-DRX setting with a lowest DRX retransmission timer value among the mappable LCHs.

* * * * *